United States Patent
Choi

(10) Patent No.: US 12,171,032 B2
(45) Date of Patent: Dec. 17, 2024

(54) METHOD FOR RELAYING DATA USING DIFFERENT FREQUENCY BANDS AND ELECTRONIC DEVICE PERFORMING SAME

(71) Applicant: SAMSUNG ELECTRONICS CO., LTD., Suwon-si (KR)

(72) Inventor: Junsu Choi, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 364 days.

(21) Appl. No.: 17/855,384

(22) Filed: Jun. 30, 2022

(65) Prior Publication Data

US 2023/0007707 A1 Jan. 5, 2023

Related U.S. Application Data

(63) Continuation of application No. PCT/KR2022/007901, filed on Jun. 3, 2022.

(30) Foreign Application Priority Data

Jun. 30, 2021 (KR) .................. 10-2021-0085693

(51) Int. Cl.
*H04W 76/10* (2018.01)
*H04W 8/00* (2009.01)

(52) U.S. Cl.
CPC .......... *H04W 76/10* (2018.02); *H04W 8/005* (2013.01)

(58) Field of Classification Search
CPC ..... H04W 48/08; H04W 48/16; H04W 28/18; H04W 72/02; H04W 8/005; H04W 76/10;
(Continued)

(56) References Cited

U.S. PATENT DOCUMENTS 7,095,748 B2     8/2006  Vij et al.
9,137,390 B2 *   9/2015  Shibata .............. H04N 1/32776
(Continued)

FOREIGN PATENT DOCUMENTS

| CN | 101562584 | 10/2009 |
| KR | 10-2006-0134104 | 12/2006 |
| KR | 10-1123527 | 3/2012 |
| KR | 10-2015-0012306 | 2/2015 |
| KR | 10-2015-0145174 | 12/2015 |
| WO | 2016/080798 | 5/2016 |
| WO | 2018/075708 | 4/2018 |

OTHER PUBLICATIONS

Search Report dated Sep. 21, 2022 issued in International Patent Application No. PCT/KR2022/007901.

*Primary Examiner* — Peter Chen
(74) *Attorney, Agent, or Firm* — Nixon & Vanderhye, P.C.

(57) ABSTRACT

According to an example embodiment, an electronic device may include: a communication module comprising communication circuitry configured to exchange data with an external device and at least one processor operationally connected to the communication module and configured to control the electronic device, wherein, through the communication module, the processor may be configured to: receive a scan command from a first main device using a first wireless communication link in a first frequency band, detect at least one external electronic device by performing a scan of a second frequency band based on the scan command, transmit a detection result of the external electronic device to the first main device using the first wireless communication link, receive an establishment command to establish a wireless link with the external electronic device from the first main device using the first wireless communication link, establish the wireless link with the external electronic device using the second frequency band based on the establishment command to establish the wireless link with the external electronic device, and transmit a result of the establishment of the wireless link to the first main device (Continued)

using the first wireless communication link, data may be exchanged between the first main device and the electronic device via the first wireless communication link and data may be exchanged between the external electronic device and the electronic device via the wireless link.

20 Claims, 11 Drawing Sheets

(58) Field of Classification Search
CPC ..... H04W 76/14; H04W 84/18; H04W 88/04; H04W 88/06; H04W 88/08; H04W 88/10; H04W 16/14; H04W 24/10
See application file for complete search history.

(56) References Cited

U.S. PATENT DOCUMENTS

| | | |
|---|---|---|
| 9,839,006 B1 * | 12/2017 | Zakaria ................ H04B 1/0057 |
| 10,356,721 B1 | 7/2019 | Arora et al. |
| 10,524,300 B2 | 12/2019 | Ueda et al. |
| 2002/0196771 A1 | 12/2002 | Vij et al. |
| 2014/0269468 A1 * | 9/2014 | Jia .......................... H04W 36/06 |
| | | 370/329 |
| 2017/0048613 A1 * | 2/2017 | Smus .................. H04L 65/1069 |
| 2021/0153000 A1 | 5/2021 | Cox et al. |

* cited by examiner

METHOD FOR RELAYING DATA USING DIFFERENT FREQUENCY BANDS AND ELECTRONIC DEVICE PERFORMING SAME

CROSS-REFERENCE TO RELATED APPLICATIONS

This application is a continuation of International Application No. PCT/KR2022/007901 designating the United States, filed on Jun. 3, 2022, at the Korean Intellectual Property Receiving Office and claiming priority to Korean Patent Application No. 10-2021-0085693, filed on Jun. 30, 2021, at the Korean Intellectual Property Office, the disclosures of which are incorporated by reference herein in their entireties.

BACKGROUND

1. Field

The disclosure relates to an electronic device for relaying data between electronic devices using different frequency bands.

2. Description of Related Art

Electronic devices that support legacy Bluetooth according to related art may search for an audio source device by scanning and output an audio signal provided by an audio source by pairing with the audio source device. For example, when a smartphone that can act as the audio source device and a wireless earphone are paired and an audio signal is generated through a music application on the smartphone, the audio signal may be output through the paired wireless earphone by being transmitted to the paired wireless earphone.

SUMMARY

When a smartphone and a wireless earphone are paired and a user wants to listen to music through the wireless earphone on a different electronic device other than the smartphone, the user may need to pair the wireless earphone with the other electronic device. In order for the wireless earphone to be paired with the other electronic device, pairing with the existing smartphone may need to be released.

Embodiments of the disclosure may provide an electronic device for relaying data between electronic devices using different frequency bands.

However, the technical aspects are not limited to the aforementioned aspects, and other technical aspects may be present.

According to various example embodiments, an electronic device includes: a communication module comprising communication circuitry configured to exchange data with an external device and at least one processor operationally connected to the communication module and configured to control the electronic device, wherein, through the communication module, the processor is configured to: receive a scan command from a first main device using a first wireless communication link in a first frequency band, detect at least one external electronic device by performing a scan of a second frequency band based on the scan command, transmit a detection result of the external electronic device to the first main device using the first wireless communication link, receive an establishment command to establish a wireless link with the external electronic device from the first main device using the first wireless communication link, establish the wireless link with the external electronic device using the second frequency band based on the establishment command to establish the wireless link with the external electronic device, and transmit a result of the establishment of the wireless link to the first main device using the first wireless communication link, wherein data is exchanged between the first main device and the electronic device via the first wireless communication link and data is exchanged between the external electronic device and the electronic device via the wireless link.

According to various example embodiments, an electronic device includes: a communication module comprising communication circuitry configured to exchange data with an external device and at least one processor operationally connected to the communication module and configured to control the electronic device, wherein, through the communication module, the processor is configured to: deactivate a first wireless communication link with a first main device in response to receiving a focusing change command from the first main device using the first wireless communication link in a first frequency band, establish a second wireless communication link with a second main device using the second wireless communication link in the first frequency band after the wireless communication link with the first main device is deactivated, and transmit information relating to an external electronic device to the second main device using the second wireless communication link in response to a wireless link being established between the electronic device and the external electronic device using a second frequency band, wherein data is exchanged between the second main device and the electronic device via the second wireless communication link and data is exchanged between the external electronic device and the electronic device via the wireless link.

According to various example embodiments, an electronic device includes: a communication module comprising communication circuitry configured to exchange data with an external device and at least one processor operationally connected to the communication module and configured to control the electronic device, wherein, the processor is configured to control the communication module to: transmit a scan command to a hub device using a first wireless communication link in a first frequency band through the communication module in response to the scan command to detect an external electronic device being received, receive a result of a scan of a second frequency band from the hub device using the first wireless communication link, wherein the scan result represents the detecting of the external electronic device, transmit an establishment command to establish a wireless link between the hub device and the external electronic device to the hub device using the first wireless communication link, and receive a result of the establishment of the wireless link from the hub device using the first wireless communication link, wherein data is exchanged between the electronic device and the hub device via the first wireless communication link and data is exchanged between the external electronic device and the hub device via the wireless link.

According to various example embodiments, an electronic device for relaying data between electronic devices using different frequency bands may be provided.

BRIEF DESCRIPTION OF THE DRAWINGS

The above and other aspects, features, and advantages of certain embodiments of the present disclosure will be more apparent from the following detailed description, taken in conjunction with the accompanying drawings, in which.

DETAILED DESCRIPTION

Hereinafter, various example embodiments of the disclosure will be described with reference to the accompanying drawings. However, this is not intended to limit the disclosure to specific example embodiments, and should be understood to include various modifications, equivalents, and/or alternatives of the example embodiments of the disclosure.

Figure 1:
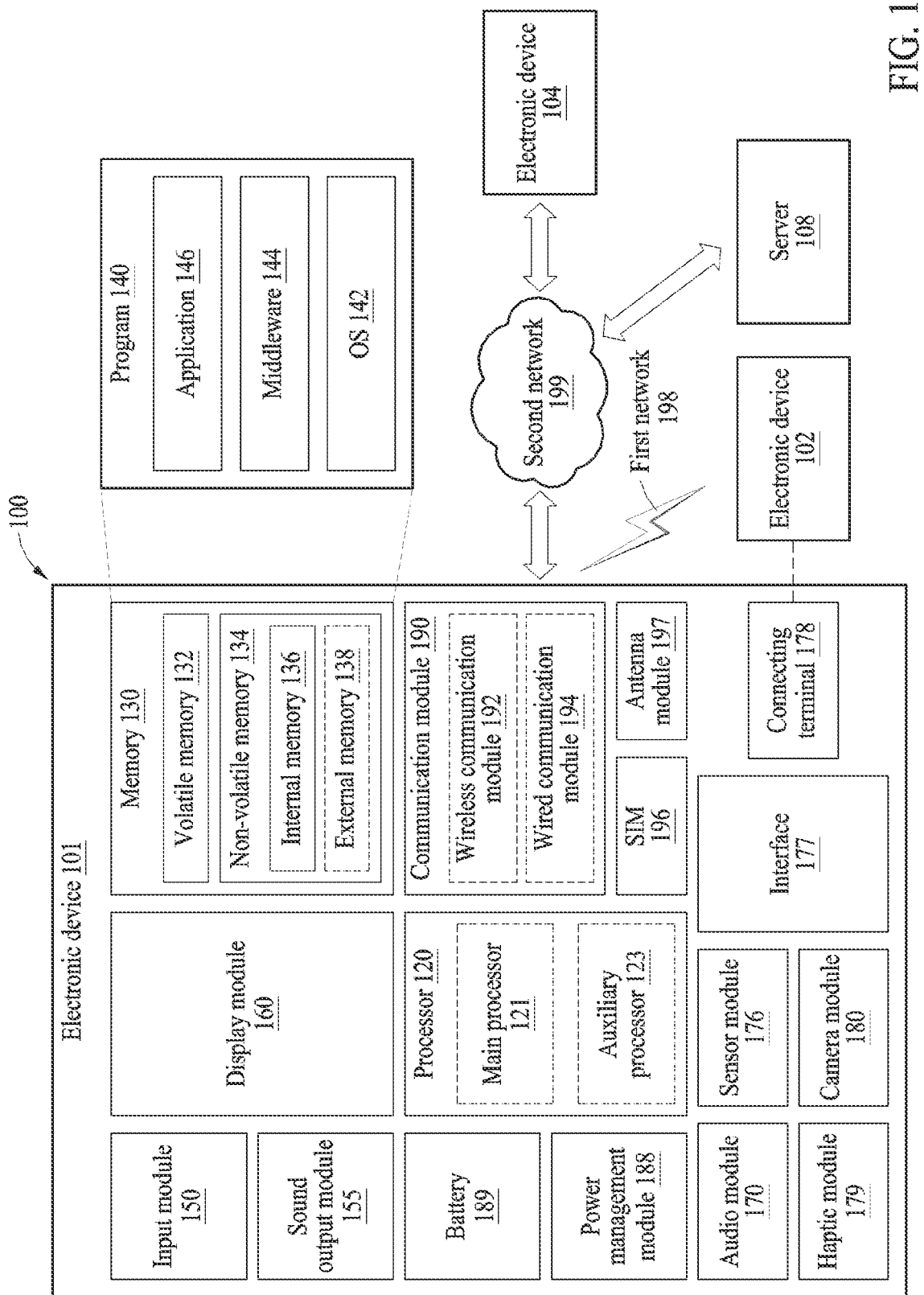
FIG. 1 is a block diagram illustrating an example electronic device in a network environment according to various embodiments.

FIG. 1 is a block diagram illustrating an example electronic device in a network environment according to various embodiments. FIG. 1 is a block diagram illustrating an electronic device 101 in a network environment 100 according to various embodiments. Referring to FIG. 1, the electronic device 101 in the network environment 100 may communicate with an electronic device 102 via a first network 198 (e.g., a short-range wireless communication network), or communicate with at least one of an electronic device 104 or a server 108 via a second network 199 (e.g., a long-range wireless communication network). According to an example embodiment, the electronic device 101 may communicate with the electronic device 104 via the server 108. According to an example embodiment, the electronic device 101 may include any one or any combination of a processor 120, a memory 130, an input module 150, a sound output module 155, a display module 160, an audio module 170, and a sensor module 176, an interface 177, a connecting terminal 178, a haptic module 179, a camera module 180, a power management module 188, a battery 189, a communication module 190, a subscriber identification module (SIM) 196, and an antenna module 197. In various example embodiments, at least one (e.g., the connecting terminal 178) of the above components may be omitted from the electronic device 101, or one or more other components may be added in the electronic device 101. In various example embodiments, some (e.g., the sensor module 176, the camera module 180, or the antenna module 197) of the components may be integrated as a single component (e.g., the display module 160).

The processor 120 may execute, for example, software (e.g., a program 140) to control at least one other component (e.g., a hardware or software component) of the electronic device 101 connected to the processor 120, and may perform various data processing or computation. According to an example embodiment, as at least a part of data processing or computation, the processor 120 may store a command or data received from another components (e.g., the sensor module 176 or the communication module 190) in a volatile memory 132, process the command or the data stored in the volatile memory 132, and store resulting data in a non-volatile memory 134. According to an example embodiment, the processor 120 may include a main processor 121 (e.g., a central processing unit (CPU) or an application processor (AP)) or an auxiliary processor 123 (e.g., a graphics processing unit (GPU), a neural processing unit (NPU), an image signal processor (ISP), a sensor hub processor, or a communication processor (CP)) that is operable independently of, or in conjunction with the main processor 121. For example, when the electronic device 101 includes the main processor 121 and the auxiliary processor 123, the auxiliary processor 123 may be adapted to consume less power than the main processor 121 or to be specific to a specified function. The auxiliary processor 123 may be implemented separately from the main processor 121 or as a part of the main processor 121.

The auxiliary processor 123 may control at least some of functions or states related to at least one (e.g., the display module 160, the sensor module 176, or the communication module 190) of the components of the electronic device 101, instead of the main processor 121 while the main processor 121 is in an inactive (e.g., sleep) state or along with the main processor 121 while the main processor 121 is an active state (e.g., executing an application). According to an example embodiment, the auxiliary processor 123 (e.g., an ISP or a CP) may be implemented as a part of another component (e.g., the camera module 180 or the communication module 190) that is functionally related to the auxiliary processor 123. According to an example embodiment, the auxiliary processor 123 (e.g., an NPU) may include a hardware structure specified for artificial intelligence model processing. An artificial intelligence model may be generated by machine learning. Such learning may be performed by, for example, the electronic device 101 in which artificial intelligence is performed, or performed via a separate server (e.g., the server 108). Learning algorithms may include, but are not limited to, for example, supervised learning, unsupervised learning, semi-supervised learning, or reinforcement learning. The artificial intelligence model may include a plurality of artificial neural network layers. An artificial neural network may include, for example, a deep neural network (DNN), a convolutional neural network (CNN), a recurrent neural network (RNN), a restricted Boltzmann machine (RBM), a deep belief network (DBN), and a bidirectional recurrent deep neural network (BRDNN), a deep Q-network, or a combination of two or more thereof, but is not limited thereto. The artificial intelligence model may additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored as software in the memory 130, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output a sound signal to the outside of the electronic device 101. The sound output module 155 may include, for example, a speaker or a receiver. The speaker may be used for general purposes, such as playing multimedia or playing record. The receiver may be used to receive an incoming call. According to an example embodiment, the receiver may be implemented separately from the speaker or as a part of the speaker.

The display module 160 may visually provide information to the outside (e.g., a user) of the electronic device 101 (e.g., a user). The display module 160 may include, for example, a control circuit for controlling a display, a hologram device, or a projector and control circuitry to control a corresponding one of the display, the hologram device, and the projector. According to an example embodiment, the display module 160 may include a touch sensor adapted to sense a touch, or a pressure sensor adapted to measure an intensity of a force incurred by the touch.

The audio module 170 may convert a sound into an electric signal or vice versa. According to an example embodiment, the audio module 170 may obtain the sound via the input module 150 or output the sound via the sound output module 155 or an external electronic device (e.g., an electronic device 102 such as a speaker or a headphone) directly or wirelessly connected to the electronic device 101.

The sensor module 176 may detect an operational state (e.g., power or temperature) of the electronic device 101 or an environmental state (e.g., a state of a user) external to the electronic device 101, and generate an electric signal or data value corresponding to the detected state. According to an example embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an example embodiment, the interface 177 may include, for example, a high-definition multimedia interface (HDMI), a universal serial bus (USB) interface, a secure digital (SD) card interface, or an audio interface.

The connecting terminal 178 may include a connector via which the electronic device 101 may be physically connected to an external electronic device (e.g., the electronic device 102). According to an example embodiment, the connecting terminal 178 may include, for example, an HDMI connector, a USB connector, an SD card connector, or an audio connector (e.g., a headphone connector).

The haptic module 179 may convert an electric signal into a mechanical stimulus (e.g., a vibration or a movement) or an electrical stimulus which may be recognized by a user via his or her tactile sensation or kinesthetic sensation. According to an example embodiment, the haptic module 179 may include, for example, a motor, a piezoelectric element, or an electric stimulator.

The camera module 180 may capture a still image and moving images. According to an example embodiment, the camera module 180 may include one or more lenses, image sensors, image signal processors, or flashes.

The power management module 188 may manage power supplied to the electronic device 101. According to an example embodiment, the power management module 188 may be implemented as, for example, at least a part of a power management integrated circuit (PMIC).

The battery 189 may supply power to at least one component of the electronic device 101. According to an example embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently of the processor 120 (e.g., an AP) and that support a direct (e.g., wired) communication or a wireless communication. According to an example embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module, or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., a LAN or a wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the SIM 196.

The wireless communication module 192 may support a 5G network after a 4G network, and a next-generation communication technology, e.g., a new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., a mmWave band) to achieve, e.g., a high data transmission rate. The wireless communication module 192 may support various technologies for securing performance on a high-frequency band, such as, e.g., beamforming, massive multiple-input and multiple-output (MIMO), full dimensional MIMO (1-D-MIMO), an array antenna, analog beam-forming, or a large scale antenna. The wireless communication module 192 may support various requirements specified in the electronic device 101, an external electronic device (e.g., the electronic device 104), or a network system (e.g., the second network 199). According to an example embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an example embodiment, the antenna module 197 may include a slit antenna, and/or an antenna including a radiating element including a conductive material or a conductive pattern formed in or on a substrate (e.g., a printed circuit board (PCB)). According to an example embodiment, the antenna module 197 may include a plurality of antennas (e.g., array antennas). In such a case, at least one antenna appropriate for a communication scheme used in a communication network, such as the first network 198 or the second network 199, may be selected by, for example, the communication module 190 from the plurality of antennas. The signal or the power may be transmitted or received between the communication module 190 and the external electronic device via the at least one selected antenna. According to an example embodiment, another component (e.g., a radio frequency integrated circuit (RFIC)) other than the radiating element may be additionally formed as a part of the antenna module 197.

According to various example embodiments, the antenna module 197 may form a mmWave antenna module. According to an example embodiment, the mmWave antenna module may include a PCB, an RFIC disposed on a first surface (e.g., a bottom surface) of the PCB or adjacent to the first surface and capable of supporting a designated a high-frequency band (e.g., the mmWave band), and a plurality of antennas (e.g., array antennas) disposed on a second surface (e.g., a top or a side surface) of the PCB, or adjacent to the second surface and capable of transmitting or receiving signals in the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an example embodiment, commands or data may be transmitted or received between the electronic device 101 and the external electronic device 104 via the server 108 coupled with the second network 199. Each of the external electronic devices 102 and 104 may be a device of the same type as or a different type from the electronic device 101. According to an example embodiment, all or some of operations to be executed by the electronic device 101 may be executed at one or more of the external electronic devices 102, 104, and 108. For example, if the electronic device 101 needs to perform a function or a service automatically, or in response to a request from a user or another device, the electronic device 101, instead of, or in addition to, executing the function or the service, may request one or more external electronic devices to perform at least part of the function or the service. The one or more external electronic devices receiving the request may perform the at least part of the function or the service requested, or an additional function or an additional service related to the request, and may transfer an outcome of the performing to the electronic device 101.

The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an example embodiment, the external electronic device 104 may include an Internet-of-things (IoT) device. The server 108 may be an intelligent server using machine learning and/or a neural network. According to an example embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

The electronic device according to various example embodiments may be one of various types of electronic devices. The electronic device may include, for example, a portable communication device (e.g., a smartphone), a computer device, a portable multimedia device, a portable medical device, a camera, a wearable device, a home appliance device, or the like. According to an example embodiment of the disclosure, the electronic device is not limited to those described above.

It should be appreciated that various example embodiments of the present disclosure and the terms used therein are not intended to limit the technological features set forth herein to particular example embodiments and include various changes, equivalents, or replacements for a corresponding example embodiment. In connection with the description of the drawings, like reference numerals may be used for similar or related components. It is to be understood that a singular form of a noun corresponding to an item may include one or more of the things, unless the relevant context clearly indicates otherwise. As used herein, "A or B", "at least one of A and B", "at least one of A or B", "A, B or C", "at least one of A, B and C", and "A, B, or C," each of which may include any one of the items listed together in the corresponding one of the phrases, or all possible combinations thereof. Terms such as "first", "second", or "first" or "second" may simply be used to distinguish the component from other components in question, and may refer to components in other aspects (e.g., importance or order) is not limited. It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various example embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an example embodiment, the module may be implemented in a form of an application-specific integrated circuit (ASIC).

Various example embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The "non-transitory" storage medium is a tangible device, and may not include a signal (e.g., an electromagnetic wave), but this term does not differentiate between where data is semi-permanently stored in the storage medium and where the data is temporarily stored in the storage medium.

According to an example embodiment, a method according to various example embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various example embodiments, each component (e.g., a module or a program) of the above-described components may include a single entity or multiple entities, and some of the multiple entities may be separately disposed in different components. According to various example embodiments, one or more of the above-described components may be omitted, or one or more other components may be added. Alternatively or additionally, a plurality of components (e.g., modules or programs) may be integrated into a single component. In such a case, according to various example embodiments, the integrated component may still perform one or more functions of each of the plurality of components in the same or similar manner as they are performed by a corresponding one of the plurality of components before the integration. According to various example embodiments, operations performed by the module, the program, or another component may be carried out sequentially, in parallel, repeatedly, or heuristically, or one or more of the operations may be executed in a different order or omitted, or one or more other operations may be added.

Figure 2A:
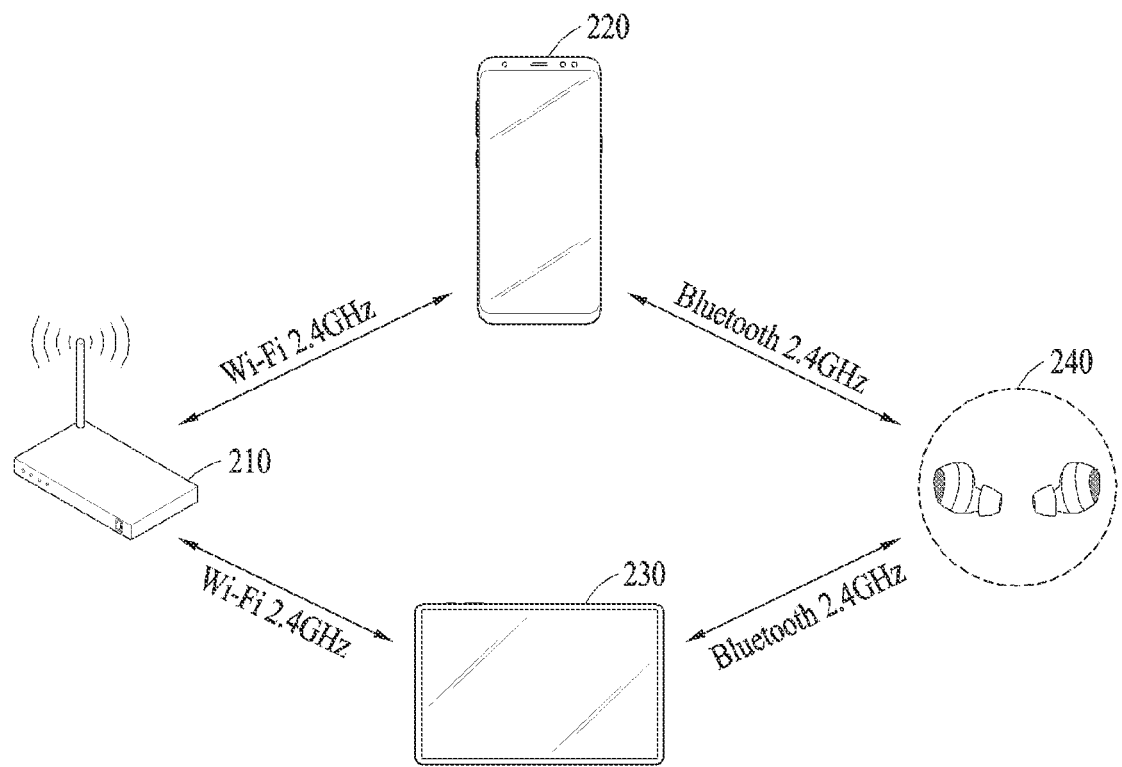
FIG. 2A is a diagram illustrating an example configuration of a data transmission system according to various embodiments.

FIG. 2A is a diagram illustrating an example configuration of a data transmission system according to various example embodiments.

According to an example embodiment, a data transmission system may include a first electronic device 220 (e.g., the electronic device 101 of FIG. 1), a second electronic device 230 (e.g., the electronic device 101 of FIG. 1), and an external electronic device 240 (e.g., the electronic device 102 of FIG. 1). Each of the first electronic device 220 and the second electronic device 230 may be, for example, and without limitation, any one of a mobile communication terminal, a notebook computer, a personal computer (PC), a tablet terminal, and a wearable device (e.g., a smart watch). The external electronic device 240 may be, for example, and without limitation, a wireless input/output device (e.g., a keyboard, a mouse, a printer, a speaker or an earphone).

According to an example embodiment, the first electronic device 220 may communicate with an external electronic device (e.g., the server 108 of FIG. 1) via an access point (AP) 210 and a first network (e.g., the first network 198 of FIG. 1) supporting Wi-Fi. For example, the first network may use a first frequency band that is an industry-science-medical (ISM) band. The first frequency band may include 2.4 GHz. The first electronic device 220 may communicate with the external electronic device 240 via a second network (e.g., Bluetooth) while using the first network. For example, the second network may use the first frequency band that is an ISM band.

According to an example embodiment, a time division (TD) scheme may be used to prevent and/or reduce interference between networks that may occur when heterogeneous networks (e.g., the first network and the second network) simultaneously operate using similar frequency bands in one first electronic device 220. In the TD scheme, latency of data transmission and reception may occur since networks transmit data by dividing time resources. As a number of resources to be used in each network increases and a quality of service (QoS) required increases, a user may feel performance degradation more severely. In the case of a Wi-Fi network, demand for services that require latency and data throughput aspects, such as high-speed network-based video streaming, games, and web conferences, is increasing. In the case of a Bluetooth network, as demand for connecting and using the external electronic device 240, such as a smart watch and a wireless earphone, with the first electronic device 220 increases, an issue of performance degradation due to coexistence between heterogeneous networks may become progressively worse.

According to an example embodiment, a user of the first electronic device 220 may use the second electronic device 230 alternately, and when the user is using the second electronic device 230, a wireless link for the second network (e.g., Bluetooth) may be newly established between the second electronic device 230 and the external electronic device 240. To establish the wireless link between the second electronic device 230 and the external electronic device 240, an existing wireless link established between the first electronic device 220 and the external electronic device 240 may need to be disabled. It may be inconvenient for the user to newly establish a wireless link between the electronic device (hereinafter, "focusing device") and the external electronic device 240, every time the user changes the focusing device.

According to an example embodiment, in order to address the aforementioned issue of performance degradation due to the coexistence of heterogeneous networks and the inconvenience to the user who alternately uses a plurality of electronic devices, a topology in which an additional hub device is added between a focusing device (e.g., the first electronic device 220 or the second electronic device 230) and the external electronic device 240 may be considered. A topology of the data transmission system including a hub device is described in greater detail below with reference to FIG. 2B.

Figure 2B:
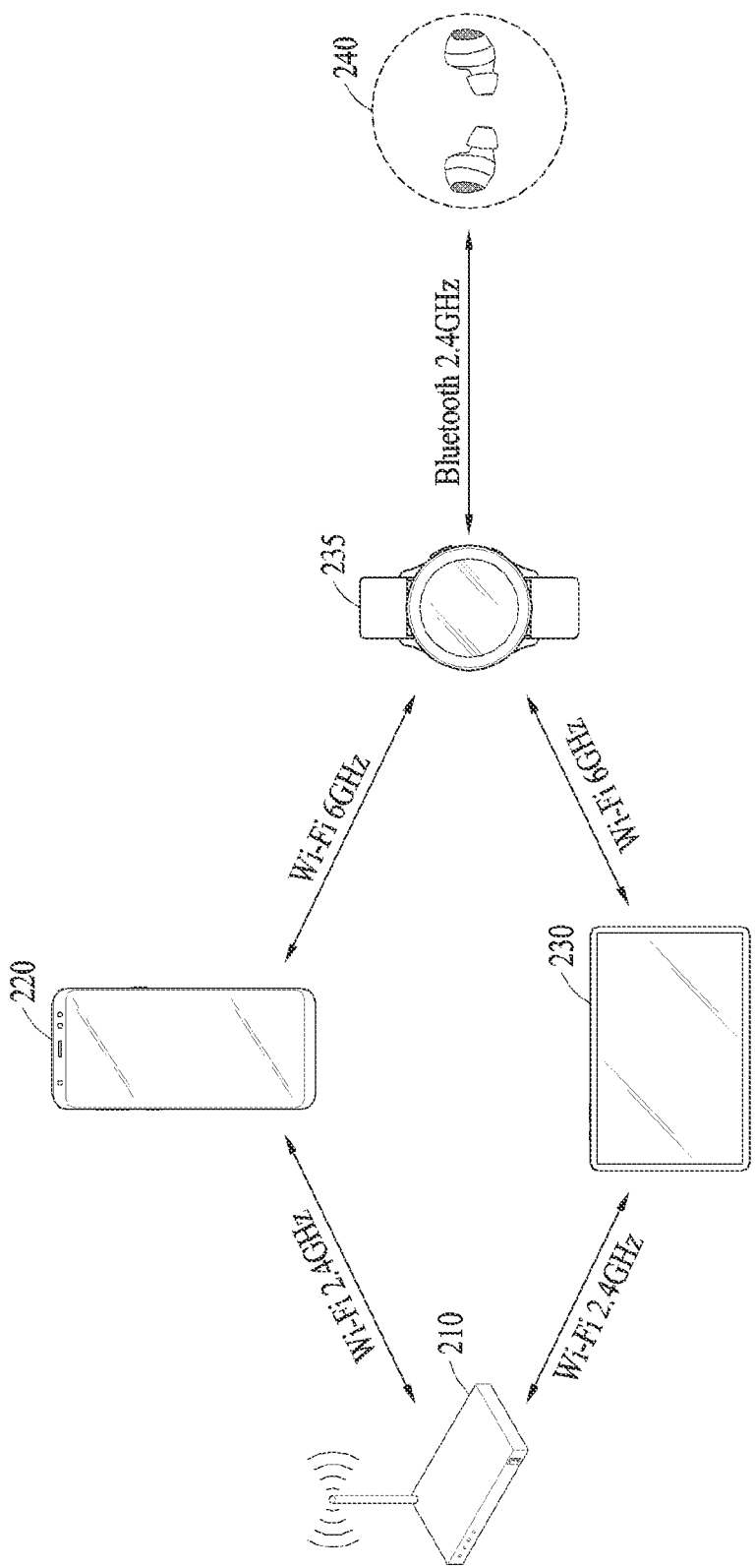
FIG. 2B is a diagram illustrating an example configuration of a data transmission system including a hub device according to various embodiments.

FIG. 2B is a diagram illustrating an example configuration of a data transmission system including a hub device according to various example embodiments.

According to an example embodiment, the data transmission system of FIG. 2B may further include a hub device 235 in the data transmission system described above with reference to FIG. 2A. The hub device 235 may be, but is not limited to, for example, a wearable device (e.g., a smart watch).

According to an example embodiment, the first electronic device 220 (or the second electronic device 230) may be connected to the hub device 235 via a Wi-Fi based third network (e.g., a high-speed wireless backhaul) using a second frequency band that is a different frequency band from a first frequency band. For example, the second frequency band of the third network may include a range of 3.1 GHz to 10.6 GHz. When the first electronic device 220 uses different frequency bands for heterogeneous networks (e.g., the first network with the AP 210 and the third network with the hub device 235), the issue of interference between networks of the first electronic device 200 may be reduced.

According to an example embodiment, the hub device 235 may establish a Bluetooth network with the external electronic device 240. For example, when the hub device 235 uses a high-speed wireless backhaul network in the second frequency band (e.g., 5 GHz to 6 GHz) for the first electronic device 220 and/or the second electronic device 230, and a Bluetooth network in the first frequency band (e.g., 2.4 GHz) for the external electronic device 240, the issue of interference between networks of the hub device 235 may be reduced.

According to an example embodiment, even when a user changes a focusing device (e.g., from the first electronic device 220 to the second electronic device 230), a wireless link between the hub device 235 and the external electronic device 240 may be maintained regardless of the focusing device being changed. For example, the hub device 235 may provide information relating to the external electronic device 240 establishing a wireless link with the hub device 235 to a new focusing device, so that the user may feel as if a wireless link is directly established between the new focusing device and the external electronic device 240. According to an example embodiment, a wireless link between the focusing device and the external electronic device 240 may be virtualized via the hub device 235. For example, using the virtualized connection generated via the hub device 235, the focusing device may perform a scan to search for the external electronic device 240, perform a pairing to connect with the external electronic device 240, and/or transmit and receive a control signal or data with the external electronic device 240. According to an example embodiment, since the user may not need to input a command (or instruction) for establishing a new wireless link for the external electronic device 240 whenever the focusing device is changed, the user may be provided with a convenient user experience.

A data transmission method using a hub device is described in greater detail below with reference to FIGS. 3 through 8.

Figure 3:
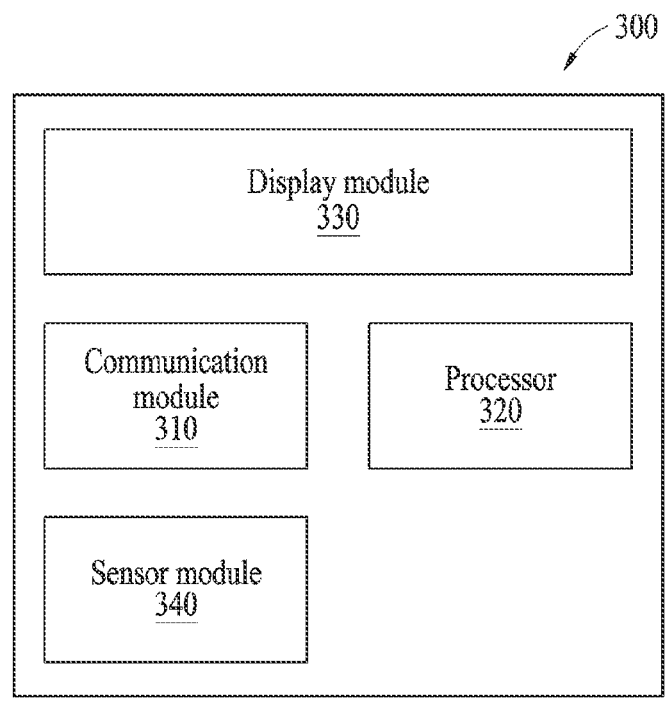
FIG. 3 is a block diagram illustrating an example configuration of an electronic device as a main device according to various embodiments.

FIG. 3 is a block diagram illustrating an example configuration of an electronic device as a main device according to various embodiments.

According to an example embodiment, an electronic device 300 (e.g., the electronic device 101 of FIG. 1, the first electronic device 220 or the second electronic device 230 of FIGS. 2A and 2B) may include a communication module (e.g., including communication circuitry) 310 (e.g., the communication module 190 of FIG. 1), a processor (e.g., including processing circuitry) 320 (e.g., the processor 120 of FIG. 1), a display module (e.g., including a display) 330 (e.g., the display module 160 of FIG. 1), and a sensor module (e.g., including a sensor) 340 (e.g., the sensor module 176 of FIG. 1). The electronic device 300 may be, for example, and without limitation, any one of a mobile communication terminal, a notebook computer, a PC, a tablet terminal, and a wearable device (e.g., a smart watch). The electronic device 300 may be referred to as a main device. When a user uses a plurality of electronic devices having same or similar functions in a same use environment, the electronic device 300 may be referred to as a first main device or a second main device.

According to an example embodiment, the communication module 310 may include various communication circuitry and support at least one or more of short-range wireless communication technologies (e.g., Bluetooth, Bluetooth low energy, Wi-Fi, and/or ultra-wideband (UWB)). For example, the communication module 310 may include one communication circuit or a plurality of communication circuits and may support heterogeneous networks.

According to an example embodiment, the processor 320 may be operationally connected to the communication module 310 and may include various processing circuitry to control the communication module 310 based on setting information (e.g., virtual connection usage information) of the electronic device 300. For example, when a virtual connection is used, the processor 320 may control the electronic device 300 so that the communication module 310 is not directly connected to an external device (e.g., the external electronic device 240) via Bluetooth, but is indirectly connected to the external device via the hub device 235.

According to an example embodiment, the display module 330 may include a display and display results of operations performed by the electronic device 300 via a display. For example, the display module 330 may display a result (e.g., a scan result) of an operation performed through the communication module 310 by the electronic device 300.

According to an example embodiment, the sensor module 340 may include a sensor and verify a use state (e.g., movement of the electronic device 300 body, a grip shape of a user of the electronic device 300 body, or whether the user is using the electronic device 300) of the electronic device 300. For example, the sensor module 340 may determine whether the electronic device 300 is a focusing device.

According to an example embodiment, the electronic device 300 may exchange data with an external device (e.g., the server 108 of FIG. 1) via an AP (e.g., the AP 210 of FIG. 2B) supporting a Wi-Fi network. For example, the electronic device 300 may exchange data with the AP using a frequency band including, but not limited to, 2.4 GHz.

According to an example embodiment, the electronic device 300 may exchange data with an electronic device (e.g., the hub device 235 of FIG. 2) via a high-speed wireless backhaul network. The high-speed wireless backhaul network may be a Wi-Fi network. For example, the electronic device 300 may exchange data with an electronic device using a frequency band including, but not limited to, at least a part of a 5 GHz to 6 GHz range.

The backhaul network may, for example, be a UWB network. For example, the UWB network may use a frequency band including at least a part of a 3.1 GHz to 10.6 GHz range.

The backhaul network may, for example, be a wireless gigabit (WiGig) network. For example, the WiGig network may use a frequency band including a frequency of 60 GHz or a frequency near 60 GHz.

According to an example embodiment, a frequency band for the Wi-Fi network and a frequency band for the high-speed wireless backhaul network may be adapted so that interference between the networks does not occur in the electronic device 300.

Figure 4:
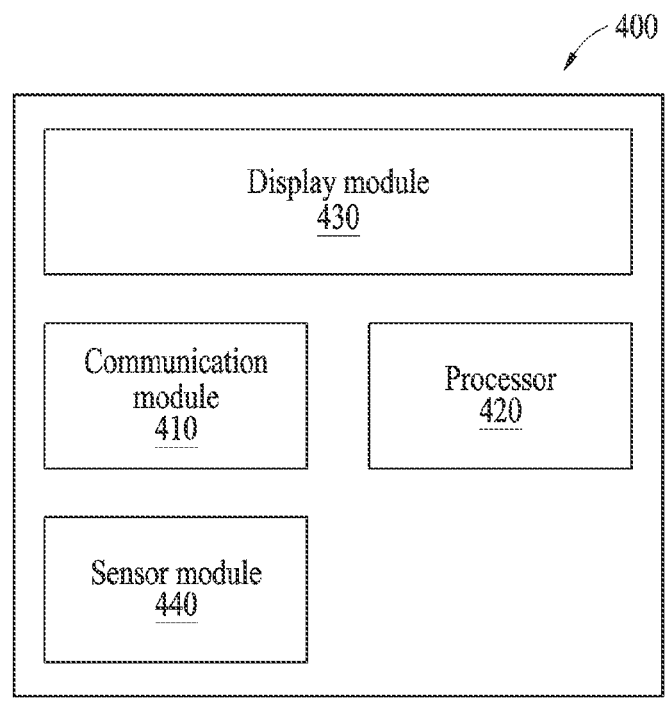
FIG. 4 is a block diagram illustrating an example configuration of an electronic device as a hub device according to various embodiments.

FIG. 4 is a block diagram illustrating an example configuration of an electronic device as a hub device according to various embodiments.

According to an example embodiment, an electronic device 400 (e.g., the electronic device 101 of FIG. 1) may include a communication module (e.g., including communication circuitry) 410 (e.g., the communication module 190 of FIG. 1), a processor (e.g., including processing circuitry) 420 (e.g., the processor 120 of FIG. 1), a display module (e.g., including a display) 430 (e.g., the display module 160 of FIG. 1), and a sensor module (e.g., including a sensor) 440 (e.g., the sensor module 176 of FIG. 1). The electronic device 400 may be, for example, and without limitation, any one of a mobile communication terminal, a notebook computer, a PC, a tablet terminal, and a wearable device (e.g., a smart watch). The term "electronic device 400" may be used interchangeably with the term "hub device 400". For example, the hub device 400 may be connected to the electronic device 300 as the main device described above with reference to FIG. 3 via a wireless network.

According to an example embodiment, the communication module 410 may include various communication circuitry and support at least one or more of short-range wireless communication technologies (e.g., Bluetooth, Bluetooth low energy, Wi-Fi, and/or UWB). For example, the communication module 410 may include one communication circuit or a plurality of communication circuits and may support heterogeneous networks.

According to an example embodiment, the processor 420 may be operationally connected to the communication module 410 and may include various processing circuitry to control the communication module 410 based on setting information (e.g., virtual connection usage information) of the electronic device 400. For example, when a virtual connection is used the communication module 410 is directly connected to an external device (e.g., the external electronic device 240) via Bluetooth, the processor 420 may transmit connected information between the communication module 410 and the external device to the electronic device 300.

According to an example embodiment, the display module 430 may include a display and display results of operations performed by the electronic device 400 via a display. For example, the display module 430 may display a result (e.g., a scan result) of an operation performed through the communication module 410 by the electronic device 400.

According to an example embodiment, the electronic device 400 may exchange data with another electronic device (e.g., the first electronic device 220, and the second electronic device 230 of FIG. 2, or the electronic device 300 of FIG. 3) via a high-speed wireless backhaul network. For example, the electronic device 400 may exchange data with another electronic device using a frequency band including, but not limited to, a range of 3.1 GHz to 10.6 GHz.

For example, the frequency band including a range of 3.1 GHz to 10.6 GHz may be a frequency band including at least a part of a 5 GHz to 6 GHz range.

According to an example embodiment, the electronic device 400 may exchange data with another electronic device (e.g., the electronic device 102 of FIG. 1 or the external electronic device 240 of FIG. 2) supporting a Bluetooth network. For example, a frequency band of the Bluetooth network may include, but is not limited to, 2.4 GHz.

According to an example embodiment, a frequency band for the Bluetooth network and a frequency band for the high-speed wireless backhaul network may be adapted so that interference between the networks does not occur in the electronic device 400.

Figure 5:
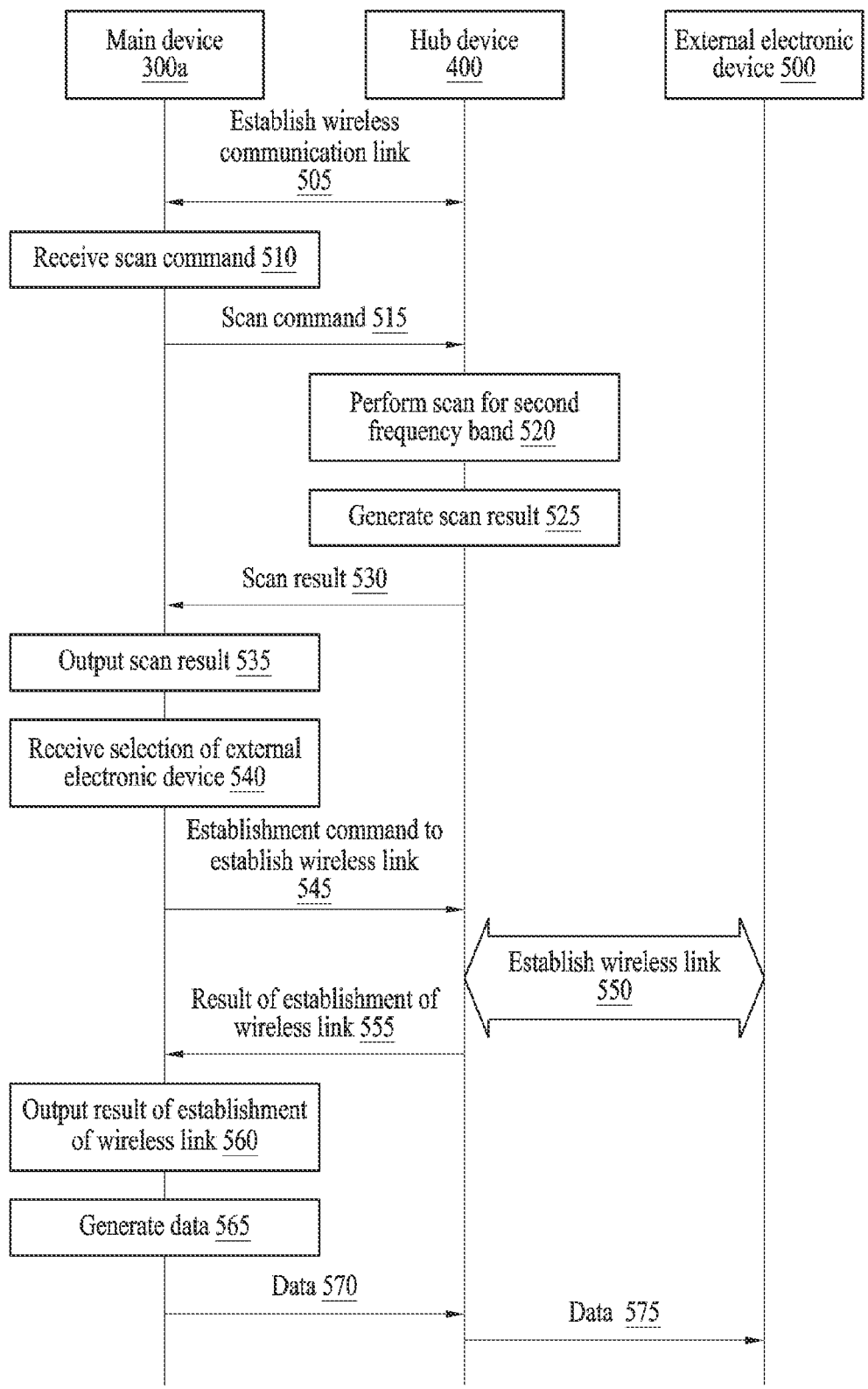
FIG. 5 is a signal flow diagram illustrating an example method of transmitting data of a main device to an external electronic device via a wireless link established between the external electronic device and a hub device according to various embodiments.

FIG. 5 is a signal flow diagram illustrating an example method of transmitting data of a main device to an external electronic device via a wireless link established between the external electronic device and a hub device according to various embodiments.

According to an example embodiment, when a user uses a main device 300a (e.g., the electronic device 300 of FIG. 3), a hub device 400, and an external electronic device 500 (e.g., the external electronic device 240 of FIG. 2) in a same use environment, the following operations (e.g., operations 505 to 575) may be performed by the main device 300a, the hub device 400, or the external electronic device 500.

In operation 505, a wireless communication link may be established via a first network between the main device 300a and the hub device 400. The first network may be, for example, a Wi-Fi based, high-speed wireless backhaul network using a first frequency band including at least a part of a 5 GHz to 6 GHz range. The first frequency band may include, for example, a range of 3.1 GHz to 10.6 GHz. The main device 300a and the hub device 400 may exchange data using a first wireless communication link in the first frequency band.

In operation 510, the main device 300a may receive a command to scan a second frequency band. For example, a user of the main device 300a may input a scan command to the main device 300a for detecting the external electronic device 500. In another example, when a designated event (e.g., execution of a designated application or movement to a designated location) occurs, the main device 300a may determine that a command to scan for the external electronic device 500 is input. According to an example embodiment, the command to scan the second frequency band may be a command to scan a frequency band that is used by a Bluetooth network of the external electronic device 500. For example, the second frequency band may include 2.4 GHz or may be a frequency band near 2.4 GHz.

According to an example embodiment, the main device 300a may output a user interface (UI) or a user experience (UX) for scanning the external electronic device 500 to the user via a display of the main device 300a. The user may input a scan command to the main device 300a using the output UI or UX. The UI for scanning the external electronic device 500 output via the display will be described in detail with reference to FIG. 6 below.

According to an example embodiment, the main device 300a may determine whether a current use setting of the main device 300a allows a virtual connection and if the virtual connection is allowed, the main device 300a may not directly perform a scan for the second frequency band. For example, when the current use setting of the main device 300a allows a virtual connection, the hub device 400 in which a wireless communication link is established with the main device 300a may be preset to perform the scan for the second frequency band instead. In another example, when the current use setting of the main device 300a does not allow the virtual connection, the main device 300*a* may directly perform the scan for the second frequency band. Hereinafter, example embodiments will be described under the assumption that the current use setting of the main device 300*a* is set to allow the virtual connection.

In operation 515, the main device 300*a* may transmit the command to scan the second frequency band to the hub device 400 using the first wireless communication link in the first frequency band. The hub device 400 may receive the scan command from the main device 300*a* using the first wireless communication link in the first frequency band.

In operation 520, the hub device 400 may scan the second frequency band based on the received scan command. The hub device 400 may detect at least one external electronic device (e.g., the external electronic device 500) by performing a scan of the second frequency band. The second frequency band may be, for example, a frequency band using a Bluetooth network. The first frequency band and the second frequency band may be adapted so that interference between the networks does not occur in the hub device 400.

According to an example embodiment, the first frequency band and the second frequency band may be adapted so as not to overlap each other.

According to an example embodiment, the first frequency band and the second frequency band may be adapted to at least partially overlap each other. Even if the first frequency band and the second frequency band at least partially overlap, the overlapping frequency bands may be adapted to minimize and/or reduce interference between networks. For example, each of the first frequency band and the second frequency band may include 2.4 GHz or a frequency near 2.4 GHz.

In operation 525, the hub device 400 may generate a scan result for a performed scan. The scan result may include, for example, information relating to the detected external electronic device 500. The information relating to the external electronic device 500 may include, for example, a type and a name of the external electronic device 500.

In operation 530, the hub device 400 may transmit a detection result of the external electronic device 500 to the main device 300*a* by transmitting the scan result to the main device 300*a* using the first wireless communication link in the first frequency band. The main device 300*a* may receive the result of a scan of the second frequency band from the hub device 400 using the first wireless communication link in the first frequency band.

In operation 535, the main device 300*a* may output the scan result to the user via a display. When the user verifies the scan result through the main device 300*a*, even though the main device 300*a* does not directly perform the scan of the second frequency band, the user may feel as if the result of a scan of the second frequency band is output from the main device 300*a*. For example, the main device 300*a* may output a UI in which the scan result is displayed via a display.

In operation 540, the main device 300*a* may receive a selection of the external electronic device 500 from, for example, the user. For example, the user may input the selection of the external electronic device 500 to the display of the main device 300*a* via the output UI.

In operation 545, when the external electronic device is selected, the main device 300*a* may transmit an establishment command to establish a wireless link via the second frequency band between the hub device 400 and the external electronic device 500 to the hub device 400. The hub device 400 may receive the establishment command to establish the wireless link with the external electronic device 500 via the second frequency band from the main device 300*a* using the first wireless communication link.

In operation 550, the hub device 400 may establish a wireless link with the external electronic device 500 using the second frequency band based on the received establishment command to establish the wireless link with the external electronic device 500. For example, a Bluetooth pairing between the hub device 400 and the external electronic device 500 may be performed through the establishment of the wireless link.

In operation 555, the hub device 400 may transmit a result of the establishment of the wireless link with the external electronic device 500 via the second frequency band to the main device 300*a* using the first wireless communication link in the first frequency band. The main device 300*a* may receive the result of the establishment of the wireless link between the hub device 400 and the external electronic device 500 via the second frequency band from the hub device 400 using the first wireless communication link.

In operation 560, the main device 300*a* may output the result of the establishment of the wireless link with the external electronic device 500. For example, the main device 300*a* may output a UI displaying the result of the establishment of the wireless link with the external electronic device 500 via a display. Although a pairing is not performed between the main device 300*a* and the external electronic device 500, the user may verify the establishment of the wireless link with the external electronic device 500 and feel as if a connection is established between the main device 300*a* and the external electronic device 500.

In operation 565, the main device 300*a* may generate data to be transmitted to the external electronic device 500. For example, the main device 300*a* may generate data based on a source stored in a memory (e.g., the memory 130 of FIG. 1). In another example, the main device 300*a* may generate data by receiving streaming data of a video or a sound source from an external device (e.g., the server 108 of FIG. 1).

In operation 570, the main device 300*a* may transmit data to the hub device 400 using the first wireless communication link in the first frequency band. The hub device 400 may receive data from the main device 300*a* using the first wireless communication link.

In operation 575, the hub device 400 may transmit data to the external electronic device 500 via a wireless link in the second frequency band. For example, if the data is an audio signal and the external electronic device 500 is an audio output device (e.g., a wireless earphone), the external electronic device 500 may output a received audio signal.

If the external electronic device 500 is, for example, an input device (e.g., a wireless keyboard or a wireless mouse), the external electronic device 500 may generate data to be transmitted to the main device 300*a*. In this example embodiment, the external electronic device 500 may transmit data to the hub device 400 via a wireless link in the second frequency band, and the hub device 400 may transmit the received data to the main device 300*a* using the first wireless communication link in the first frequency band.

According to an example embodiment, the main device 300*a* may exchange data with the external electronic device 500 via the hub device 400. By separating frequency bands of networks used by each of the main device 300*a* and the hub device 400, interference between the networks that may occur in each of the main device 300*a* and the hub device 400 may be reduced.

Although not shown, according to an example embodiment, the main device 300*a* may exchange data with another external device (e.g., the AP 210 of FIG. 2) via a wireless link in a frequency band including (or, overlapping) at least a part of a second frequency band in which a Bluetooth pairing between the hub device 400 and the external electronic device 500 is performed, and since the main device 300*a* is not directly connected to the external electronic device 500 via the second frequency band, interference between networks may be reduced.

Figure 6:
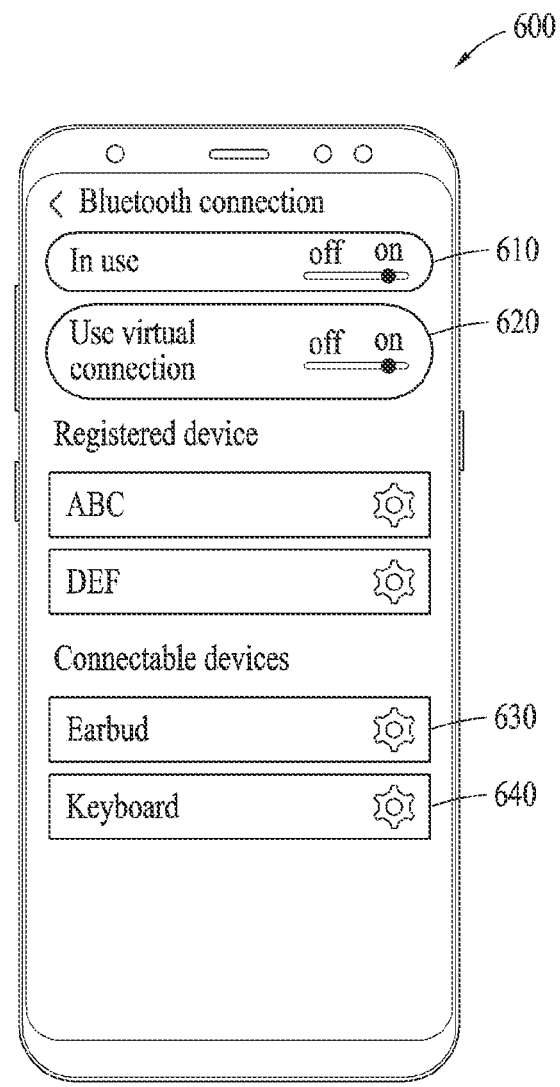
FIG. 6 is a diagram illustrating an example user interface (UI) provided to a user of a main device according to various embodiments.

FIG. 6 is a diagram illustrating an example UI provided to a user of a main device according to various embodiments.

According to an example embodiment, a UI 600 output via a display of the main device 300*a* described above with reference to FIG. 5 may be provided to the user. The UI 600 may be a UI for a Bluetooth connection of the main device 300*a*.

According to an example embodiment, the UI 600 may include a first sub UI 610 indicating whether a Bluetooth network is used via the main device 300*a*. The user may or may not use the Bluetooth network by changing a status of the first sub UI 610. According to an example embodiment, the UI 600 may include a second sub UI 620 indicating whether a virtual connection via the hub device 400 of FIG. 5 in which a wireless communication link is established with the main device 300*a* is used. The user may or may not use the virtual connection to the Bluetooth network by changing a status of the second sub UI 620. The virtual connection to the Bluetooth network may be an indirect connection to an external electronic device (e.g., the external electronic device 500 of FIG. 5) via the hub device 400. For example, if the user wants to use the Bluetooth network and not use the virtual connection, the main device 300*a* may detect the external electronic device by directly scanning a second frequency band. In another example, if the user wants to use the Bluetooth network and use the virtual connection, the main device 300*a* may transmit a scan command to scan for the second frequency band via a first wireless communication link in a first frequency band to the hub device 400 that is connected via the first frequency band, and may receive a scan result from the hub device 400. The example embodiment shown in FIG. 6 is an embodiment of a case where the user may want to use the Bluetooth network and the virtual connection. For example, when the hub device 400 receives the scan command from the main device 300*a* using the first wireless communication link in the first frequency band, the hub device 400 may scan the second frequency band to detect a first external electronic device and a second external electronic device, and may transmit a result of a scan of the detected first external electronic device and second external electronic device to the main device 300*a* using the first wireless communication link in the first frequency band. The main device 300*a* may output information of the first external electronic device 630 and information of the second external electronic device 640 as the scan result via the UI 600. For example, the user may connect the first external electronic device with the main device 300*a* via the hub device 400 by selecting the output information of the first external electronic device 630.

According to an example embodiment, the main device 300*a* may activate the virtual connection while in wireless communication connection with the external electronic device 500 via the Bluetooth network while the virtual connection is deactivated. In this embodiment, the main device 300*a* may send a request to the hub device 400 to establish a wireless link between the hub device 400 and the external electronic device 500 and may terminate the Bluetooth network connection with the external electronic device 500. For example, the main device 300*a* may change a direct connection with the external electronic device 500 via the Bluetooth network to a virtual connection via the hub device 400.

Figure 7:
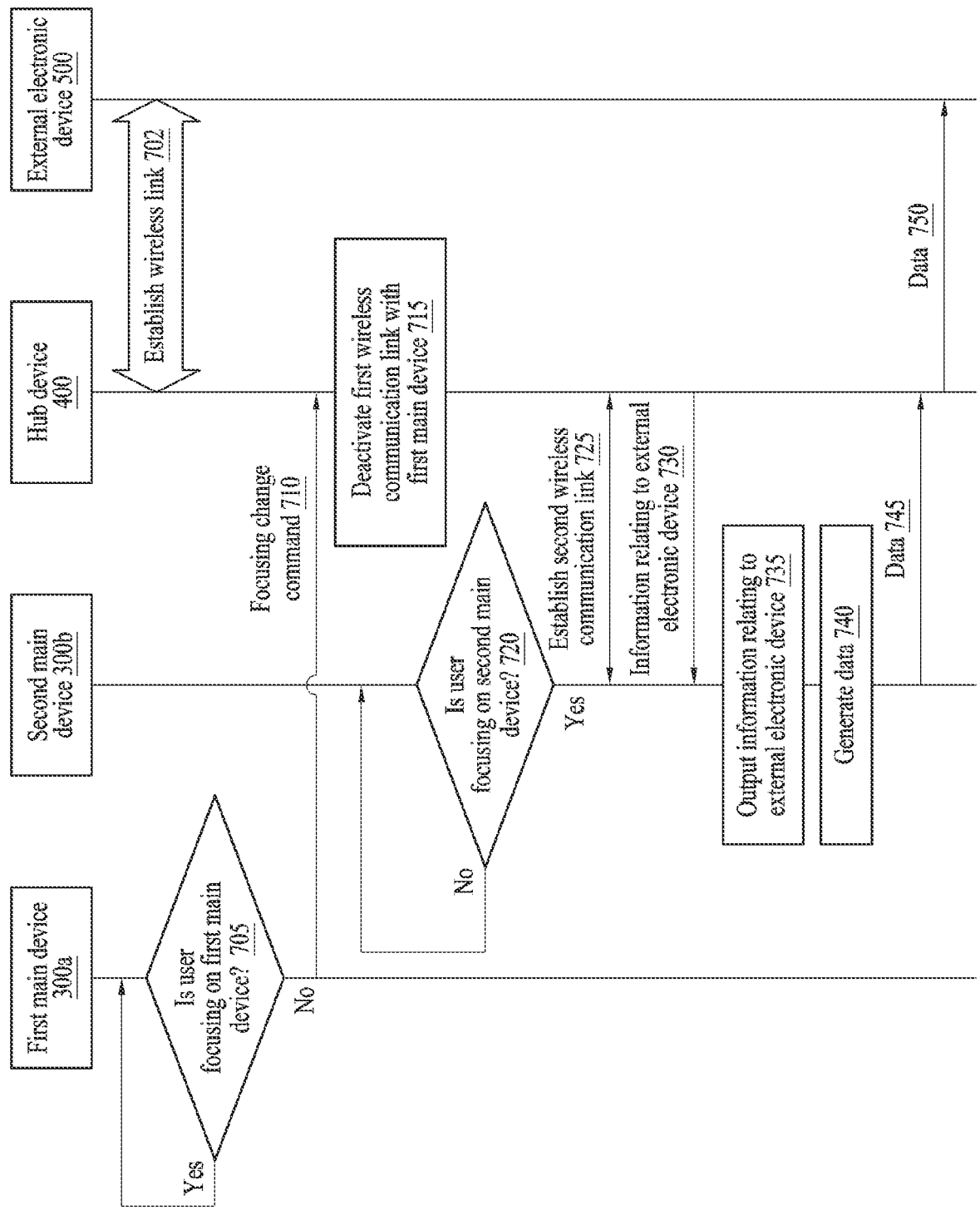
FIG. 7 is a signal flow diagram illustrating an example method of transmitting data via an existing wireless link established between a hub device and an external electronic device, in response to a change in main device a user is focusing on, according to various embodiments.

FIG. 7 is a signal flow diagram illustrating an example method of transmitting data via an existing wireless link established between a hub device and an external electronic device, in response to a change in main device a user is focusing on according to various embodiments.

According to an example embodiment, a data transmission method for a use environment in which a same user alternately uses a plurality of electronic devices may be considered. For example, a user may use the main device 300*a* (e.g., a smartphone) of FIG. 5 and then use another main device 300*b* (e.g., a tablet terminal) that is another electronic device. A change of electronic device being used by the user may be referred to as "a change of focusing device". To make clear the distinction between the main device 300*a* and the main device 300*b*, the main device 300*a* may be referred to as a "first main device 300*a*" and the main device 300*b* may be referred to as a "second main device 300*b*" below.

When the user changes the focusing device from the first main device 300*a* to the second main device 300*b* while the first main device 300*a* is directly paired to an external electronic device 500, the user may need to release the pairing between the first main device 300*a* and the external electronic device 500 and perform pairing between the second main device 300*b* and the external electronic device 500 again to use the external electronic device 500.

A method of transmitting data of a focusing device to the external electronic device 500 via a wireless link while an existing wireless link (or, pairing) with the external electronic device 500 is being maintained even when the focusing device is changed, is described in greater detail below through the description of operations 705 to 745.

According to an example embodiment, an operation 702 of establishing a wireless link between a hub device 400 and the external electronic device 500 may be performed prior to operation 705 being performed. Operation 702 may correspond to, for example, operation 550 described above with reference to FIG. 5. Operations 705 to 745 may be, for example, operations performed after operation 560 described above with reference to FIG. 5 is performed.

In operation 705, the first main device 300*a* may determine whether the user is focusing on the first main device 300*a*.

According to an example embodiment, a sensor module (e.g., the sensor module 340 of FIG. 3) of the first main device 300*a* may include at least one sensor that generates sensing information.

According to an example embodiment, the sensor may include an acceleration sensor. The acceleration sensor may generate acceleration information on a movement of the first main device 300*a* as the sensing information. For example, a processor (e.g., the processor 320 of FIG. 3) of the first main device 300*a* may determine whether the user is focusing on the first main device 300*a* by determining whether the user is using the first main device 300*a* based on the acceleration information.

According to an example embodiment, the sensor may include a camera sensor. The camera sensor may generate a user image as the sensing information. For example, the processor of the first main device 300*a* may determine whether the user is focusing on the first main device 300*a* by detecting a face of the user based on the user image and determining whether the user is looking at the first main device 300*a*.

According to an example embodiment, the sensor may include a touch sensor. The touch sensor may be disposed on at least one side of a housing of the first main device 300a. The touch sensor may determine whether the user is touching or holding the first main device 300a as the sensing information. For example, when the user is touching or holding the first main device 300a, the processor of the first main device 300a may determine whether the user is focusing on the first main device 300a.

According to an example embodiment, when a preset condition is met, the first main device 300a may determine that the user is not focusing on the first main device 300a. For example, when a pointer output on a display of the first main device 300a is located on a preset area, it may be determined that the user is not focusing on the first main device 300a. In another example, when a graphic object output on the display of the first main device 300a is selected, it may be determined that the user is not focusing on the first main device 300a. When the user performs a preset action, it is possible to transmit to the first main device 300a a determination that the user is not focusing on the first main device 300a. In another example, when a focusing change command is received from the second main device 300b that is a former focusing device, it may be determined that the user is focusing on the first main device 300a.

According to an example embodiment, the sensor may include a deactivation button of the first main device 300a. For example, the deactivation button may be a power button. When the deactivation button is pressed while the first main device 300a is in an activation state, it may be determined that the user is not focusing on the first main device 300a.

In operation 710, when the user is not focusing on the first main device 300a, the first main device 300a may transmit a focusing change command to the hub device 400 using a first wireless communication link in a first frequency band. The hub device 400 may receive the focusing change command from the first main device 300a using the first wireless communication link.

In operation 715, when the hub device 400 receives the focusing change command from the first main device 300a, a wireless communication link with the first main device 300a may be deactivated. For example, the first wireless communication link in the first frequency band may be deactivated.

According to an example embodiment, even when the wireless communication link between the hub device 400 and the first main device 300a is deactivated, the wireless link between the hub device 400 and the external electronic device 500 may be maintained and not disabled.

In operation 720, the second main device 300b may determine whether the user is focusing on the second main device 300b. For example, when the user starts to use the second main device 300b after using the first main device 300a, the user may focus on the second main device 300b. The description of operation 705 may also describe a method of determining whether the user is focusing on the second main device 300b.

In operation 725, when it is determined that the use is focusing on the second main device 300b, a wireless communication link may be established between the second main device 300b and the hub device 400.

According to an example embodiment, a wireless communication link may be established between the second main device 300b and the hub device 400 via a first network. The first network may be, for example, a Wi-Fi based, high-speed wireless backhaul network using a first frequency band including at least a part of a 5 GHz to 6 GHz range. The second main device 300b and the hub device 400 may exchange data using a second wireless communication link in the first frequency band.

In operation 730, when a wireless communication link is established between the second main device 300b and the hub device 400, the hub device 400 may transmit information relating to the external electronic device 500 to the second main device 300b using the second wireless communication link in the first frequency band. The information relating to the external electronic device 500 may be, for example, information relating to the wireless link established between the hub device 400 and the external electronic device 500. The second main device 300b may receive information relating to the external electronic device 500 from the hub device 400 using the second wireless communication link.

In operation 735, the second main device 300b may output information relating to the external electronic device 500. For example, the second main device 300b may output a UI in which the information relating to the external electronic device 500 is displayed via a display. Although a wireless link is not established by a physical connection between the second main device 300b and the external electronic device 500, the user may verify the information relating to the external electronic device 500 and feel as if a direct connection is established between the second main device 300b and the external electronic device 500.

According to an example embodiment, the user may control a virtual connection between the second main device 300b and the external electronic device 500 via the output UI. For example, the user may disable the virtual connection between the second main device 300b and the external electronic device 500. When the user disables the virtual connection, in reality, the wireless link between the hub device 400 and the external electronic device 500 may be disabled.

According to an example embodiment, the user may desire to establish a virtual connection between the second main device 300b and a new external electronic device. In order to establish the virtual connection between the second main device 300b and the new external electronic device, operations 510 to 560 described above with reference to FIG. 5 may be performed in a similar manner with respect to the second main device 300b.

In operation 740, the second main device 300b may generate data to be transmitted to the external electronic device 500. For example, the second main device 300b may generate data based on a source stored in a memory (e.g., the memory 130 of FIG. 1). In another example, the second main device 300b may generate data by receiving streaming data of a video or a sound source from an external device (e.g., the server 108 of FIG. 1).

In operation 745, the second main device 300b may transmit data to the hub device 400 using the second wireless communication link in the first frequency band. The hub device 400 may receive the data from the second main device 300b using the second wireless communication link.

In operation 750, the hub device 400 may transmit data to the external electronic device 500 via a wireless link in the second frequency band. For example, if the data is an audio signal and the external electronic device 500 is an audio output device (e.g., a wireless earphone), the external electronic device 500 may output a received audio signal.

If the external electronic device 500 is, for example, an input device (e.g., a wireless keyboard or a wireless mouse), the external electronic device 500 may generate data to be transmitted to the second main device 300b. In this example embodiment, the external electronic device 500 may transmit data to the hub device 400 via a wireless link in the second frequency band, and the hub device 400 may transmit the received data to the second main device 300b using the second wireless communication link in the first frequency band.

According to an example embodiment, the second main device 300b may exchange data with the external electronic device 500 via the hub device 400. By separating frequency bands of networks used by each of the second main device 300b and the hub device 400, interference between the networks that may occur in each of the second main device 300b and the hub device 400 may be reduced.

According to an example embodiment, the hub device 400 may include a communication module (e.g., the communication module 410 of FIG. 4) configured to exchange data with an external device and at least one processor (e.g., the processor 420 of FIG. 4) configured to control the hub device 400. When the processor receives a focusing change command from the first main device 300a using the first wireless communication link in the first frequency band, the processor may deactivate (or, disable) a wireless communication link with the first main device 300a, and after the wireless communication link with the first main device 300a is deactivated, establish a wireless communication link with the second main device 300b using the second wireless communication link in the first frequency band, and when a wireless link is established between the hub device 400 and the external electronic device 500 using the second frequency band, the processor may transmit information relating to the external electronic device 500 to the second main device 300b using the second wireless communication link.

Figure 8:
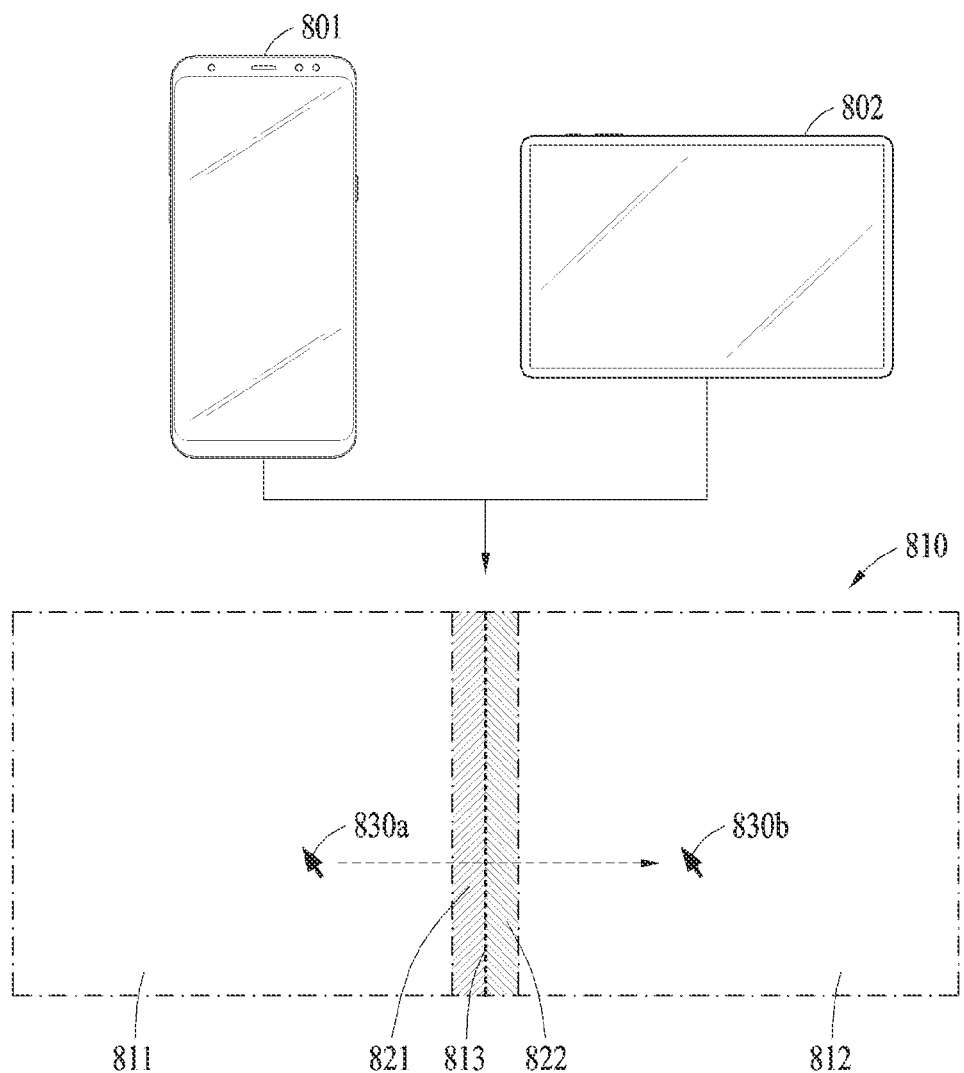
FIG. 8 is a diagram illustrating an example method of a first main device generating a focusing change command according to various embodiments.

FIG. 8 is a diagram illustrating an example method of a first main device generating a focusing change command according to various embodiments.

According to an example embodiment, an environment in which a user simultaneously uses a first main device 801 (e.g., the first main device 300a of FIG. 7) and a second main device 802 (e.g., the second main device 300b of FIG. 7) may be considered.

According to an example embodiment, a wireless communication link may be established between the first main device 801 and the second main device 802. For example, the wireless communication link may be established between the first main device 801 and the second main device 802 via a first network. The first network may be, for example, a Wi-Fi based, high-speed wireless backhaul network using a first frequency band including at least a part of a 5 GHz to 6 GHz range, and is not limited thereto.

According to an example embodiment, a virtual screen 810 of a display may be set based on the wireless communication link between the first main device 801 and the second main device 802. For example, a first area 811 of the virtual screen 810 may correspond to an output of a display of the first main device 801 and a second area 812 of the virtual screen 810 may correspond to an output of a display of the second main device 802. The first area 811 and the second area 812 may be perceived separately based, for example, on a boundary line 813.

According to an example embodiment, a focusing device may be determined based on a location of a pointer on the virtual screen 810. For example, a wireless link may be established between a hub device (e.g., the hub device 400 of FIG. 4) and an external electronic device (e.g., the external electronic device 500 of FIG. 5) via a second network using a second frequency band, and a wireless communication link may be established between the hub device and the first main device 801 or the second main device 802 via a first network using a first frequency band. For example, if the external electronic device is an input device (e.g., a mouse or a touch pad), the user may control the location of the pointer on the virtual screen 810 via the external electronic device.

According to an example embodiment, when a location 830a of the pointer on the virtual screen 810 is located on the first area 811, the first main device 801 may be determined as the focusing device, and when a location 830b of the pointer on the virtual screen 810 is located on the second area 812, the second main device 802 may be determined as the focusing device. For example, when the pointer located at the first area 811 moves to a second boundary area 822 by passing through a first boundary area 821, or is located at the first boundary area 821, the first main device 801 may transmit a focusing change command to the hub device and the second main device 802. When the hub device receives the focusing change command from the first main device 801, the hub device may deactivate (or, disable) or activate (or, maintain) a first wireless communication link between the first main device 801 and the hub device according to setting options. For example, when a second wireless communication link is not established between the second main device 802 and the hub device, the hub device may establish or activate the second wireless communication link between the second main device 802 and the hub device. In another example, when the second main device 802 and/or the hub device receives the focusing change command from the first main device 801, the second main device 802 and/or the hub device may establish or activate the second wireless communication link between the second main device 802 and the hub device if the second wireless communication link is not already established between the second main device 802 and the hub device.

Similar to the above-described embodiment, when the pointer located at the second area 812 moves to the first boundary area 821 by passing through the second boundary area 822, or is located at the second boundary area 822, the second main device 802 transmits a focusing change command to the hub device and the first main device 801.

According to an example embodiment, even when the user is using any one of the first main device 801 and the second main device 802, the first main device 801 and the second main device 802 may both be outputting audio signals respectively. For example, the first main device 801 may be outputting a first audio signal and the second main device 802 may be outputting a second audio signal. For example, even when the user is using the first main device 801, the second wireless communication link between the second main device 802 and the hub device may be maintained or activated. The hub device may: receive the first audio signal via the first wireless communication link with the first main device 801; receive the second audio signal via the second wireless communication link with the second main device 802; generate a mixed audio signal by mixing the first audio signal and the second audio signal; and transmit the generated audio signal to an external electronic device via the second network using a wireless link in the second frequency band. The external electronic device may output the mixed audio signal. The user may simultaneously perceive audio signals output from the first main device 801 and the second main device 802 through the mixed audio signal that is output.

Figure 9:
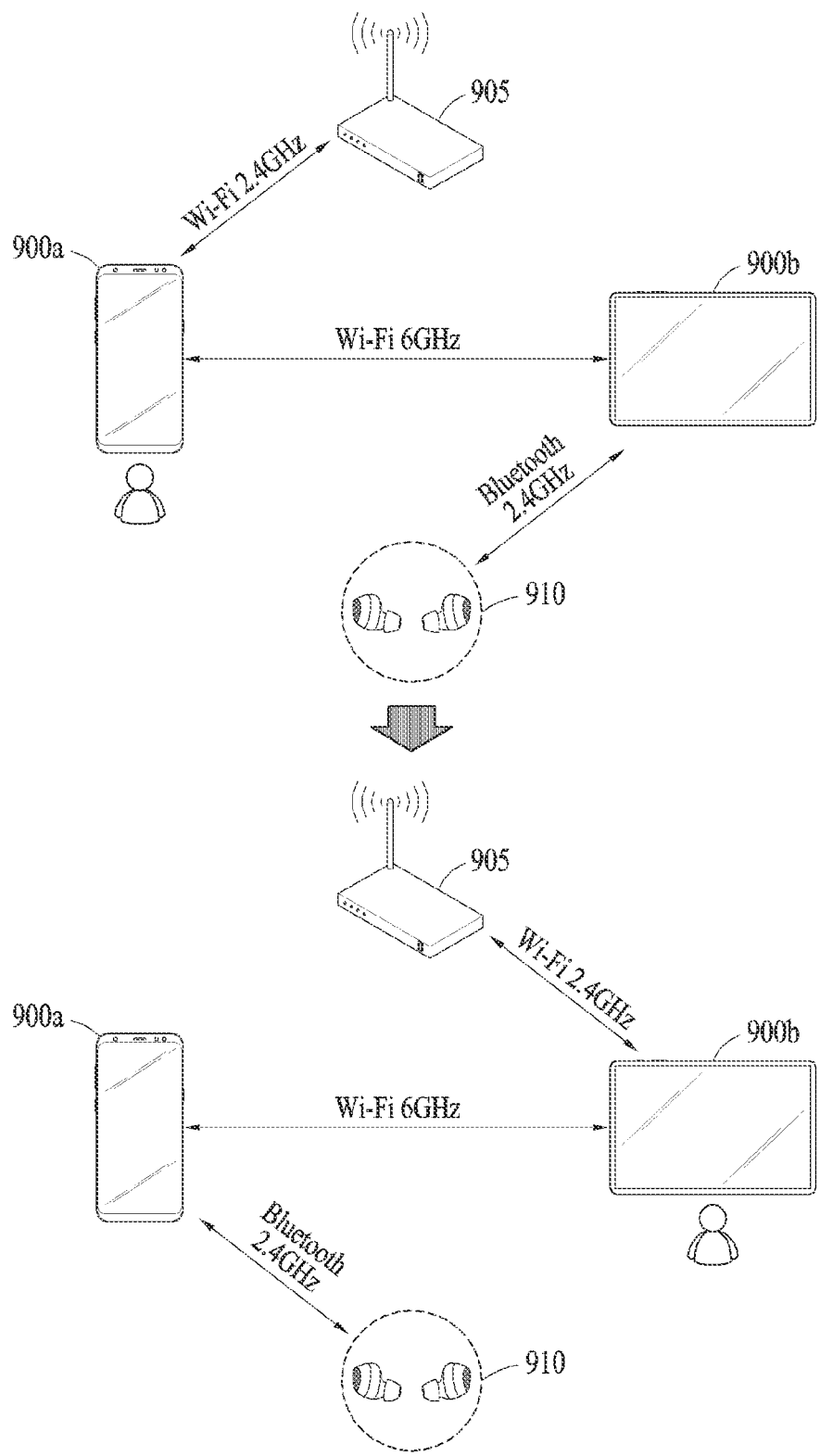
FIG. 9 is a diagram illustrating an example connection topology that changes between devices when a user focus changes between a main device and a hub device according to various embodiments.

FIG. 9 is a diagram illustrating an example connection topology that changes between devices when a user focus changes between a main device and a hub device according to various embodiments.

According to an example embodiment, a data transmission system of FIG. 9 may include a first main device 900a (e.g., the first electronic device 220 of FIG. 2 or the first main device 300a of FIG. 7), a second main device 900b (e.g., the second electronic device 230 of FIG. 2 or the second main device 300b of FIG. 7), an external electronic device 910 (e.g., the external electronic device 240 of FIG. 2 or the external electronic device 500 of FIG. 5), and an AP 905. The first main device 900a and the second main device 900b may be, for example, and without limitation, any one of a mobile communication terminal, a notebook computer, a PC, a tablet terminal, and a wearable device (e.g., a smart watch), respectively. The external electronic device 910 may be, for example, and without limitation, a wireless input/output device (e.g., a keyboard, a mouse, a printer, a speaker or an earphone).

According to an example embodiment, the first main device 900a may operate as a focusing device and the second main device 900b may operate as a hub device (e.g., the hub device 235 of FIG. 2 or the electronic device 400 of FIG. 4). In such system topology, the first main device 900a may perform Wi-Fi networking with the AP 905 using a 2.4 GHz frequency band, and perform high-speed wireless backhaul networking with the second main device 900b using a 6 GHz frequency band, and the second main device 900b may perform high-speed wireless backhaul networking with the first main device 900a using the 6 GHz frequency band, and perform Bluetooth networking with the external electronic device 910 using the 2.4 GHz frequency band.

According to an example embodiment, when the focusing device of a user is changed from the first main device 900a to the second main device 900b, the above-mentioned system topology may change to a topology in which the second main device 900b may operate as the focusing device and the first main device 900a may operate as the hub device. In such system topology, the second main device 900b may perform Wi-Fi networking with the AP 905 using the 2.4 GHz frequency band, and perform high-speed wireless backhaul networking with the first main device 900a using a 6 GHz frequency band, and the first main device 900a may perform high-speed wireless backhaul networking with the second main device 900b using the 6 GHz frequency band, and perform Bluetooth networking with the external electronic device 910 using the 2.4 GHz frequency band. Since the hub device is not fixed in the above-mentioned system, a device that performs Bluetooth networking with the external electronic device 910 may change according to the topology. When the hub device changes according to the topology, a wireless link for Bluetooth networking may be newly established with the changed hub device.

Hereinafter, a method of transmitting data using the data transmission system of FIG. 9 is described in greater detail below with reference to FIG. 10.

Figure 10:
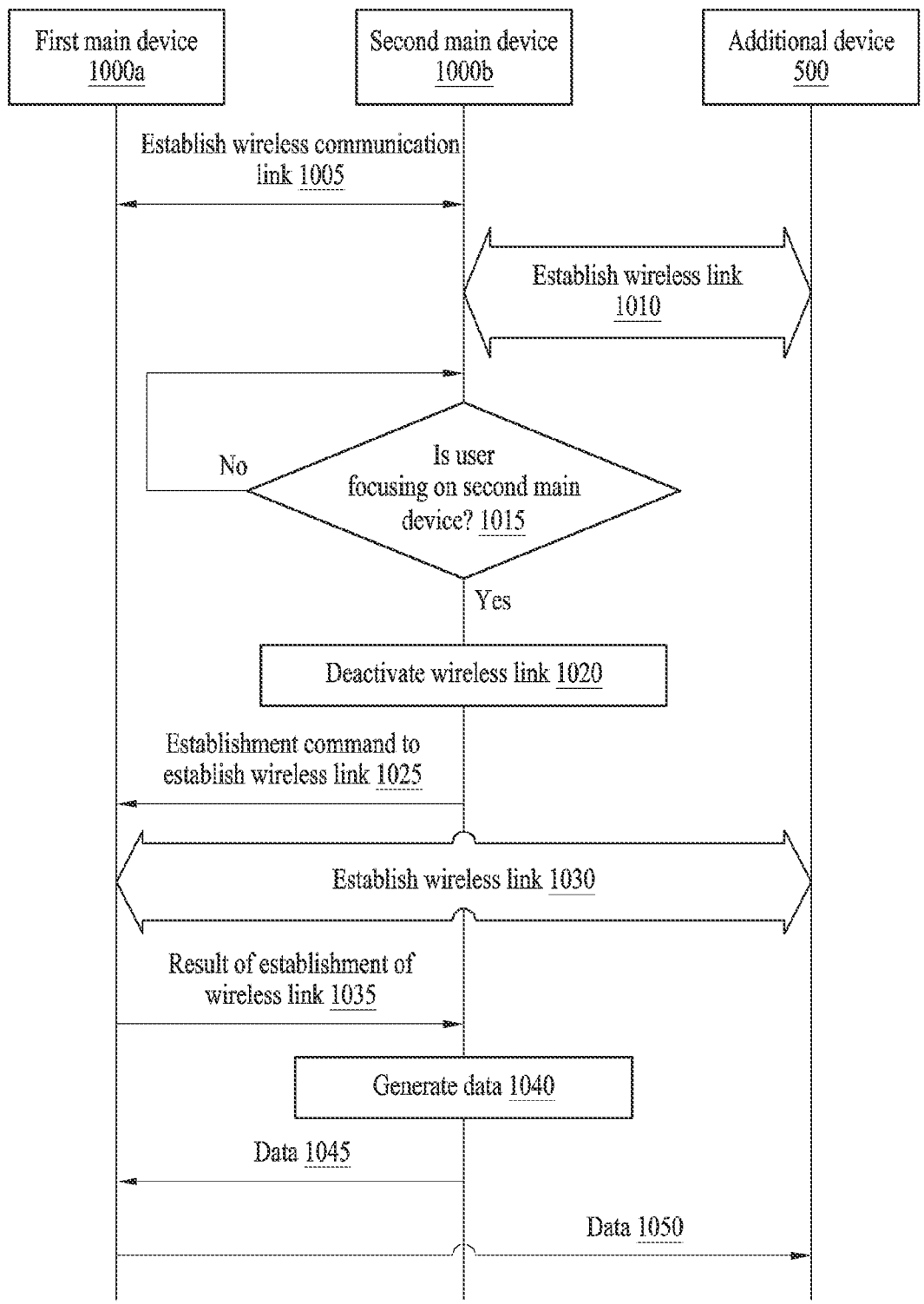
FIG. 10 is a signal flow diagram illustrating an example method of transmitting data when a user focus changes between a main device and a hub device according to various embodiments.

FIG. 10 is a signal flow diagram illustrating an example method of transmitting data when a user focus changes between a main device and a hub device according to various embodiments.

According to an example embodiment, when a user uses a first main device 1000a (e.g., the first electronic device 220 of FIG. 2, the first main device 300a of FIG. 7, or a first main device 900a of FIG. 9), a second main device 1000b (e.g., the second electronic device 230 of FIG. 2, the second main device 300b of FIG. 7, or the second main device 900b of FIG. 9), and the external (or additional) electronic device 500 (e.g., the external electronic device 240 of FIG. 2) in a same use environment, operations 1005 to 1050 described below may be performed by the first main device 1000a, the second main device 1000b, or the external electronic device 500. For example, operation 1005 may be performed when the first main device 1000a operates as the focusing device.

In operation 1005, a wireless communication link may be established between the first main device 1000a and the second main device 1000b via a first network. The first network may be, for example, a Wi-Fi based, high-speed wireless backhaul network using a first frequency band including at least a part of a 5 GHz to 6 GHz range. The first main device 1000a and the second main device 1000b may exchange data using the wireless communication link of the first frequency band.

According to an example embodiment, after operation 1005 is performed, operations 510 to 545 described above with reference to FIG. 5 may be further performed. The descriptions of functions of the hub device (e.g., the hub device 400 of FIG. 5) in operations 510 to 545 may also be used to describe functions of the second main device 1000b.

In operation 1010, the second main device 1000b may establish a wireless link as a physical connection with the external/additional electronic device 500 using a second frequency band based on an establishment command to establish a wireless link with the external electronic device 500 received from the first main device 1000a. For example, a Bluetooth pairing may be performed between the second main device 1000b and the external electronic device 500 through the establishment of the wireless link.

In operation 1015, the second main device 1000b may determine whether the user is focusing on the second main device 1000b. The description of operation 705 described above with reference to FIG. 7 may also be used as a detailed description of operation 1015. When it is determined that the user is focusing on the second main device 1000b, operation 1020 may be performed.

In operation 1020, the second main device 1000b may disable the wireless link with the external electronic device 500.

In operation 1025, the second main device 1000b may transmit the establishment command to establish the wireless link with the external electronic device 500 to the first main device 1000a. The first main device 1000a may receive the establishment command to establish the wireless link from the second main device 1000b. The first main device 1000a may function as a hub device.

In operation 1030, the first main device 1000a may establish a wireless link by a physical connection with the external electronic device 500 using the second frequency band based on the received establishment command to establish the wireless link with the external electronic device 500. According to an example embodiment, the first main device 1000a may perform a scan using the second frequency band and perform a pairing with the external electronic device 500 verified through the scan. For example, a Bluetooth pairing may be performed between the first main device 1000a and the external electronic device 500 through the establishment of the wireless link.

In operation 1035, the first main device 1000a may transmit a result of the establishment of the wireless link to the second main device 1000b using the wireless communication link of the first frequency band. The second main device 1000b may receive the result of the establishment of the wireless link from the first main device 1000a using the wireless communication link of the first frequency band.

In operation 1040, the second main device 1000b may generate data to be transmitted to the external electronic device 500. For example, the second main device 1000b may generate data by receiving streaming data of a video or a sound source from an external device (e.g., the server 108 of FIG. 1).

In operation 1045, the second main device 1000b may transmit the data to the first main device 1000a using the wireless communication link of the first frequency band. The first main device 1000a may receive the data from the second main device 1000b using the wireless communication link of the first frequency band.

In operation 1050, the first main device 1000a may transmit data to the external electronic device 500 via a wireless link of the second frequency band. For example, if the data is an audio signal and the external electronic device 500 is an audio output device (e.g., a wireless earphone), the external electronic device 500 may output a received audio signal.

According to an example embodiment, an electronic device (e.g., the hub device 235 of FIG. 2, or the electronic device 400 of FIG. 4) may include: a communication module comprising communication circuitry (e.g., the communication module 410 of FIG. 4) configured to exchange data with an external device and at least one processor (e.g., the processor 420 of FIG. 4) operationally connected to the communication module and configured to control the electronic device, wherein, through the communication module, the processor may be configured to: receive a scan command from a first main device (e.g., the first electronic device 220 or the second electronic device 230 of FIG. 2, or the electronic device 300 of FIG. 3) using a first wireless communication link in a first frequency band, detect at least one external electronic device (e.g., the external electronic device 240 of FIG. 2 or the external electronic device 500 of FIG. 5) by performing a scan of a second frequency band based on the scan command, transmit a detection result of the external electronic device to the first main device using the first wireless communication link, receive an establishment command to establish a wireless link with the external electronic device from the first main device using the first wireless communication link, establish the wireless link with the external electronic device using the second frequency band based on the establishment command to establish the wireless link with the external electronic device, and transmit a result of the establishment of the wireless link to the first main device using the first wireless communication link.

According to an example embodiment, the first frequency band may include a range of 3.1 GHz to 10.6 GHz.

According to an example embodiment, the second frequency band may include 2.4 GHz.

According to an example embodiment, a Bluetooth pairing may be performed between the electronic device and the external electronic device through the establishment of the wireless link.

According to an example embodiment, the processor may be configured to: receive a focusing change command from the first main device using the first wireless communication link, deactivate a wireless communication link with the first main device in response to receiving the focusing change command, establish a wireless communication link with a second main device using a second wireless communication link in the first frequency band, and transmit information relating to the external electronic device to the second main device using the second wireless communication link, data may be exchanged between the first main device and the electronic device via the second wireless communication link and data may be exchanged between the external electronic device and the electronic device via the wireless link.

According to an example embodiment, the processor may be configured to: determine whether a user is focusing on the electronic device, deactivate the wireless link with the external electronic device in response to a determination that the user is focusing on the electronic device, transmit an establishment command to establish a wireless link with the external electronic device to the first main device using the first wireless communication link, and receive a result of the establishment of a second wireless link with the external electronic device from the first main device using the first wireless communication link, data may be exchanged between the electronic device and the external electronic device via the first wireless communication link and the second wireless link.

According to an example embodiment, the electronic device may be a wearable device.

According to an example embodiment, an electronic device (e.g., the hub device 235 of FIG. 2 or the electronic device 400 of FIG. 4) may include a communication module comprising communication circuitry (e.g., the communication module 410 of FIG. 4) configured to exchange data with an external device and at least one processor (e.g., the processor 420 of FIG. 4) operationally connected to the communication module and configured to control the electronic device, wherein, through the communication module, the processor may be configured to: deactivate a first wireless communication link with a first main device (e.g., the first electronic device 220 of FIG. 2 or the first main device 300a of FIG. 7) in response to receiving a focusing change command from the first main device using the first wireless communication link in a first frequency band, establish a second wireless communication link with a second main device (e.g., the second electronic device 230 of FIG. 2 or the second main device 300b of FIG. 7) using the second wireless communication link in the first frequency band after the wireless communication link with the first main device is deactivated, and transmit information relating to an external electronic device (e.g., the external electronic device 240 of FIG. 2 or the external electronic device 500 of FIG. 5) to the second main device using the second wireless communication link in response to a wireless link being established between the electronic device and the external electronic device using a second frequency band, data may be exchanged between the second main device and the electronic device via the second wireless communication link and data may be exchanged between the external electronic device and the electronic device via the wireless link.

According to an example embodiment, the processor may be configured to: receive an associated command from the second main device using the first wireless communication link and establish the second wireless communication link with the second main device based on the associated command.

According to an example embodiment, the information relating to the external electronic device may be provided to the user via a display (e.g., the display module 330 of FIG. 3) of the second main device.

According to an example embodiment, the processor may be configured to: receive a scan command from the first main device using the first wireless communication link, detect the external electronic device by performing a scan of the second frequency band based on the scan command, transmit a detection result of the external electronic device to the first main device using the first wireless communication link, receive an establishment command to establish a wireless link with the external electronic device from the first main device using the first wireless communication link, and establish the wireless link between the electronic device and the external electronic device using the second frequency band based on the establishment command to establish the wireless link with the external electronic device.

According to an example embodiment, a main device (e.g., the first electronic device 220 or the second electronic device 230 of FIG. 2, or the electronic device 300 of FIG. 3) may include a communication module comprising communication circuitry (e.g., the communication module 310 of FIG. 3) configured to exchange data with an external device and at least one processor (e.g., the processor 320 of FIG. 3) configured to control the main device, wherein, the processor may be configured to control the main device to: transmit a scan command to a hub device (e.g., the hub device 235 of FIG. 2 or the electronic device 400 of FIG. 4) using a first wireless communication link in a first frequency band in response to the scan command to detect an external electronic device (e.g., the external electronic device 500 of FIG. 5) being received, receive a result of a scan of a second frequency band from the hub device using the first wireless communication link, wherein the scan result represents detection of the external electronic device, transmit an establishment command to establish a wireless link between the hub device and the external electronic device to the hub device using the first wireless communication link in response to the external electronic device being selected, and receive a result of the establishment of the wireless link from the hub device using first wireless communication link.

According to an example embodiment, the first frequency band may include a range of 3.1 GHz to 10.6 GHz.

According to an example embodiment, the second frequency band may include 2.4 GHz.

According to an example embodiment, the electronic device may further include a display (e.g., the display module 330 of FIG. 3) operationally connected to the processor, wherein the processor may be configured to output the detection of the external electronic device via the display in response to receiving the scan result.

According to an example embodiment, the electronic device may further include: at least one sensor (e.g., the sensor module 340 of FIG. 3) operationally connected to the processor and configured to generate sensing information, wherein the processor may be configured to: determine whether the user is focusing on the electronic device based on the sensing information, transmit a focusing change command to the hub device using the first wireless communication link in response to a determination that the user is not focusing on the electronic device, and the first wireless communication link between the electronic device and the hub device may be deactivated based on the focusing change command.

According to an example embodiment, the sensor may include an acceleration sensor, and the processor may be configured to determine whether the user is focusing on the electronic device by determining whether the user is using the electronic device based on the sensing information generated by the acceleration sensor.

According to an example embodiment, the sensor may include a deactivation button on the electronic device, and the processor may be configured to determine that the user is not focusing on the electronic device in response to the deactivation button being pushed.

According to an example embodiment, through the communication module, the processor may be configured to exchange data with an AP via a wireless communication link in a frequency band including at least a part of the second frequency band.

According to an example embodiment, the hub device may be a wearable device.

The example embodiments described herein may be implemented using hardware components, software components and/or combinations thereof. A processing device may be implemented using one or more general-purpose or special purpose computers, such as, for example, a processor, a controller and an arithmetic logic unit (ALU), a digital signal processor, a microcomputer, a field programmable gate array (FPGA), a programmable logic unit (PLU), a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is singular; however, one skilled in the art will appreciate that a processing device may include multiple processing elements and multiple types of processing elements. For example, a processing device may include multiple processors or a processor and a controller. In addition, different processing configurations are possible, such as parallel processors.

Software may include a computer program, a piece of code, an instruction, or a combination of one or more thereof, to independently or collectively instruct or configure the processing device to operate as desired. Software and/or data may be embodied permanently or temporarily in any type of machine, component, physical or virtual equipment, computer storage medium or device, or transmitted signal wave capable of providing instructions or data to or being interpreted by the processing device. The software also may be distributed over network-coupled computer systems so that the software is stored and executed in a distributed fashion. The software and data may be stored by one or more non-transitory computer-readable recording mediums.

The methods according to the above-described examples may be recorded in non-transitory computer-readable media including program instructions to implement various operations of the above-described examples. The media may also include, alone or in combination with the program instructions, data files, data structures, and the like. The program instructions recorded on the media may be those specially designed and constructed for the purposes of examples, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blueray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher-level code that may be executed by the computer using an interpreter. The above-described hardware devices may be configured to act as one or more software modules in order to perform the operations of the above-described examples, or vice versa.

While this disclosure includes specific examples that are provided by way of illustration and not limitation, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents.

Therefore, the scope of the disclosure includes all variations within the scope of the claims and their equivalents are to be construed as being included in the disclosure. It will also be understood that any of the embodiment(s) described herein may be used in conjunction with any other embodiment(s) described herein.

What is claimed is:

1. An electronic device, comprising:
a communication module comprising communication circuitry configured to exchange data with an external device; and
at least one processor operationally connected to the communication module and configured to control the electronic device,
wherein, through the communication module, the processor is configured to:
receive a scan command from a first main device using a first wireless communication link in a first frequency band;
detect at least one external electronic device by performing a scan of a second frequency band based on the scan command;
transmit a detection result of the external electronic device to the first main device using the first wireless communication link;
receive an establishment command to establish a wireless link with the external electronic device from the first main device using the first wireless communication link;
establish the wireless link with the external electronic device using the second frequency band based on the establishment command to establish the wireless link with the external electronic device; and
transmit a result of the establishment of the wireless link to the first main device using the first wireless communication link,
wherein data is exchanged between the first main device and the electronic device via the first wireless communication link and data is exchanged between the external electronic device and the electronic device via the wireless link.

2. The electronic device of claim 1, wherein the first frequency band comprises a range of 3.1 GHz to 10.6 GHz.

3. The electronic device of claim 1, wherein the second frequency band comprises 2.4 GHz.

4. The electronic device of claim 3, wherein a Bluetooth pairing is performed between the electronic device and the external electronic device through the establishment of the wireless link.

5. The electronic device of claim 1, wherein the processor is further configured to:
receive a focusing change command from the first main device using the first wireless communication link;
deactivate a wireless communication link with the first main device in response to receiving the focusing change command;
establish a wireless communication link with a second main device using a second wireless communication link in the first frequency band;
transmit information relating to the external electronic device to the second main device using the second wireless communication link, and
data is exchanged between the first main device and the electronic device via the second wireless communication link and data is exchanged between the external electronic device and the electronic device via the wireless link.

6. The electronic device of claim 1, wherein the processor is further configured to:
determine whether a user is focusing on the electronic device;
deactivate the wireless link with the external electronic device in response to a determination that the user is focusing on the electronic device;
transmit an establishment command to establish a wireless link with the external electronic device to the first main device using the first wireless communication link; and
receive a result of the establishment of a second wireless link with the external electronic device from the first main device using the first wireless communication link,
wherein data is exchanged between the electronic device and the external electronic device via the first wireless communication link and the second wireless link.

7. The electronic device of claim 1, wherein the electronic device is a wearable device.

8. An electronic device, comprising:
a communication module comprising communication circuitry configured to exchange data with an external device; and
at least one processor operationally connected to the communication module and configured to control the electronic device,
wherein, through the communication module, the processor is configured to:
deactivate a first wireless communication link with a first main device in response to receiving a focusing change command from the first main device using the first wireless communication link in a first frequency band;
establish a second wireless communication link with a second main device using the second wireless communication link in the first frequency band after the wireless communication link with the first main device is deactivated;
transmit information relating to an external electronic device to the second main device using the second wireless communication link in response to a wireless link being established between the electronic device and the external electronic device using a second frequency band, and
data is exchanged between the second main device and the electronic device via the second wireless communication link and data is exchanged between the external electronic device and the electronic device via the wireless link.

9. The electronic device of claim 8, wherein the processor is further configured to:
receive an associated command from the second main device using the first wireless communication link; and
establish the second wireless communication link with the second main device based on the associated command.

10. The electronic device of claim 8, wherein the information relating to the external electronic device is provided via a display of the second main device.

11. The electronic device of claim 8, wherein the processor is further configured to:
receive a scan command from the first main device using the first wireless communication link;
detect the external electronic device by performing a scan of the second frequency band based on the scan command;
transmit a detection result of the external electronic device to the first main device using the first wireless communication link;
receive an establishment command to establish a wireless link with the external electronic device from the first main device using the first wireless communication link; and
establish the wireless link between the electronic device and the external electronic device using the second frequency band based on the establishment command to establish the wireless link with the external electronic device.

12. An electronic device, comprising:
a communication module comprising communication circuitry configured to exchange data with an external device; and
at least one processor operationally connected to the communication module and configured to control the electronic device,
wherein, the processor is configured to control the electronic device to:
transmit a scan command to a hub device using a first wireless communication link in a first frequency band through the communication module based on the scan command to detect an external electronic device being received from a user;
receive a result of a scan of a second frequency band from the hub device using the first wireless communication link, wherein the scan result represents the detection of the external electronic device;
transmit an establishment command to establish a wireless link between the hub device and the external electronic device to the hub device using the first wireless communication link; and
receive a result of the establishment of the wireless link from the hub device using first wireless communication link,
data is exchanged between the electronic device and the hub device via the first wireless communication link and data is exchanged between the external electronic device and the hub device via the wireless link.

13. The electronic device of claim 12, wherein the first frequency band comprises a range of 3.1 GHz to 10.6 GHz.

14. The electronic device of claim 12, wherein the second frequency band comprises 2.4 GHz.

15. The electronic device of claim 12, further comprising a display operationally connected to the processor, wherein the processor is configured to control the display to output the detection of the external electronic device in response to receiving the scan result.

16. The electronic device of claim 12, further comprising at least one sensor operationally connected to the processor and configured to generate sensing information,
wherein the processor is configured to:
determine whether the user is focusing on the electronic device based on the sensing information; and
control the communication module to transmit a focusing change command to the hub device using the first wireless communication link in response to a determination that the user is not focusing on the electronic device,
the first wireless communication link between the electronic device and the hub device is deactivated based on the focusing change command.

17. The electronic device of claim 16, wherein the sensor includes an acceleration sensor, and the processor is configured to determine whether the user is focusing on the electronic device by determining whether the user is using the electronic device based on the sensing information generated by the acceleration sensor.

18. The electronic device of claim 16, wherein the sensor includes a deactivation button on the electronic device, and the processor is configured to determine that the user is not focusing on the electronic device in response to the deactivation button being pushed.

19. The electronic device of claim 12, wherein, through the communication module, the processor is configured to exchange data with an access point (AP) via a wireless communication link in a frequency band comprising at least a part of the second frequency band.

20. The electronic device of claim 12, wherein the hub device comprises a wearable device.

* * * * *